(12) United States Patent
Ajami et al.

(10) Patent No.: US 12,262,411 B2
(45) Date of Patent: Mar. 25, 2025

(54) COORDINATED SCHEDULING AND SIGNALING OF RESTRICTED TARGET WAKE TIME (R-TWT) SERVICE PERIODS

(71) Applicant: QUALCOMM Incorporated, San Diego, CA (US)

(72) Inventors: Abdel Karim Ajami, San Diego, CA (US); Sai Yiu Duncan Ho, San Diego, CA (US); George Cherian, San Diego, CA (US); Alfred Asterjadhi, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/516,375

(22) Filed: Nov. 1, 2021

(65) Prior Publication Data
US 2023/0140312 A1 May 4, 2023

(51) Int. Cl.
*H04W 74/04* (2009.01)
*H04W 72/0453* (2023.01)
(Continued)

(52) U.S. Cl.
CPC ....... *H04W 74/04* (2013.01); *H04W 72/0453* (2013.01); *H04W 74/0816* (2013.01); *H04W 74/0866* (2013.01); *H04W 84/12* (2013.01)

(58) Field of Classification Search
CPC ............. H04W 84/12; H04W 74/0866; H04W 74/0816; H04W 72/0453; H04W 74/04
See application file for complete search history.

(56) References Cited

U.S. PATENT DOCUMENTS

2008/0056177 A1* 3/2008 Mori ..................... H04W 52/04
370/318
2020/0267636 A1 8/2020 Cavalcanti et al.
(Continued)

FOREIGN PATENT DOCUMENTS

WO WO-2022114716 A1 6/2022

OTHER PUBLICATIONS

"35. Extremely High Throughput (EHT), MAC Specification 35. 1 Introduction", IEEE Draft, TGBE_CL_35, IEEE-SA, Piscataway, NJ, USA, vol. 802.11be, Drafts, No. D1.2, Sep. 23, 2021, pp. 1-96, XP068185764, p. 326 section 35.3.3 p. 353-354 section 35.3.14 p. 362-365 sections 35.3.16-35.3.17, section 35.3.14.1, p. 35.
(Continued)

*Primary Examiner* — James P Duffy
(74) *Attorney, Agent, or Firm* — Holland & Hart LLP

(57) ABSTRACT

This disclosure provides methods, devices and systems for protecting latency-sensitive communications during restricted target wake time (r-TWT) service periods (SPs). Some implementations more specifically relate to coordinated scheduling of r-TWT SPs between OBSSs. In some aspects, a first AP may coordinate with a second AP in scheduling r-TWT SPs so that latency-sensitive traffic in a first BSS does not interfere or collide with latency-sensitive traffic in a second BSS overlapping the first BSS. In some implementations, the first and second APs may schedule their respective r-TWT SPs to be orthogonal in time. In some other implementations, the first and second APs may schedule their r-TWT SPs to overlap in time, while allocating coordinated resources to concurrent or overlapping latency-sensitive traffic in the first and second BSSs (such as in accordance with one or more multi-AP coordination techniques).

21 Claims, 19 Drawing Sheets

(51) Int. Cl.
  *H04W 74/08* (2009.01)
  *H04W 74/0816* (2024.01)
  *H04W 84/12* (2009.01)

(56) References Cited

U.S. PATENT DOCUMENTS

2021/0329500 A1* 10/2021 Cariou ............... H04W 80/02
2022/0201591 A1*  6/2022 Xin .................... H04W 48/10
2022/0386372 A1* 12/2022 Xin .................... H04W 74/002
2022/0408355 A1* 12/2022 Shafin ................ H04W 24/08

OTHER PUBLICATIONS

International Search Report and Written Opinion—PCT/US2022/041923—ISA/EPO—Dec. 5, 2022.
Nezou P. (Canon), et al., "Low-Latency Triggered TWT", 11-20-1843-02-00BE-LOW-Latency-Triggered-TWT, IEEE-SA Mentor, Piscataway, NJ, USA, vol. 802.11 EHT, 802.11be, No. 2, Dec. 17, 2020, pp. 1-14, 2020-12-16, XP068175533, pp. 2-5, Slides 3-7.

* cited by examiner

COORDINATED SCHEDULING AND SIGNALING OF RESTRICTED TARGET WAKE TIME (R-TWT) SERVICE PERIODS

TECHNICAL FIELD

This disclosure relates generally to wireless communication, and more specifically, to coordinated scheduling and signaling of restricted target wake time (r-TWT) service periods.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving coordinated restricted target wake time (r-TWT) signaling information associated with a first r-TWT service period (SP) associated with an overlapping basic service set (OBSS); transmitting r-TWT schedule information indicating a second r-TWT SP associated with a basic service set (BSS) associated with the wireless communication device based on the coordinated r-TWT signaling information; and communicating with one or more first wireless stations (STAs) during the second r-TWT SP based on a respective latency requirement of each of the one or more first STAs.

In some aspects, the first r-TWT SP may be orthogonal to the second r-TWT SP in time. In some other aspects, the first r-TWT may overlap the second r-TWT SP in time. In some implementations, the communicating with the one or more first STAs may include transmitting a multi-user request-to-send (MU-RTS) frame to the one or more first STAs. In some other implementations, the coordinated r-TWT signaling information may include shared SP information indicating a multiple access point (multi-AP) coordination opportunity associated with the first r-TWT SP. In such implementations, the communicating with the one or more first STAs may include coordinating with an access point (AP) associated with the OBSS based on the shared SP information so that the communications with the one or more first STAs occur concurrently with communications in the OBSS.

In some implementations, the coordinating with the AP may include exchanging, with the AP, transmit power information indicating at least one of a transmit power associated with the communications with the one or more first STAs or a transmit power associated with the communications in the OBSS. In some other implementations, the coordinating with the AP may include exchanging, with the AP, frequency resource information indicating at least one of an allocation of frequency resources for the communications with the one or more first STAs or an allocation of frequency resources for the communications in the OBSS.

In some aspects, the coordinated r-TWT signaling information may indicate an allocation of resources for the second r-TWT SP. In some other aspects, the coordinated r-TWT signaling information may indicate an allocation of resources for the first r-TWT SP. In some implementations, the method may further include negotiating, with an AP associated with the OBSS, an allocation of resources for the second r-TWT SP based on the coordinated r-TWT signaling information. In some implementations, the coordinated r-TWT signaling information may be carried in one or more packets transmitted to the wireless communication device by an AP associated with the OBSS. In some other implementations, the coordinated r-TWT signaling information may be carried in one or more management frames transmitted, by an AP associated with the OBSS, to one or more STAs associated with the OBSS. In some implementations, the coordinated r-TWT signaling information may be received from a STA associated with the BSS that intercepts the one or more management frames transmitted by the AP associated with the OBSS.

In some aspects, the method may further include transmitting r-TWT coordination information indicating the first r-TWT SP associated with the OBSS. In some implementations, the r-TWT schedule information and the r-TWT coordination information may be carried in a broadcast target wake time (TWT) information element (IE) included in one or more packets transmitted by the wireless communication device. In some other implementations, the r-TWT schedule information and the r-TWT coordination information may be carried in a broadcast TWT IE and a coordinated r-TWT IE, respectively, included in one or more packets transmitted by the wireless communication device, where the coordinated r-TWT IE is different than the broadcast TWT IE.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving coordinated r-TWT signaling information associated with a first r-TWT SP associated with an OBSS; transmitting r-TWT schedule information indicating a second r-TWT SP associated with a BSS associated with the wireless communication device based on the coordinated r-TWT signaling information; and communicating with one or more STAs during the second r-TWT SP based on a respective latency requirement of each of the one or more STAs.

Another innovative aspect of the subject matter described in this disclosure can be implemented as a method of wireless communication. The method may be performed by a wireless communication device and may include transmitting first coordinated r-TWT signaling information indicating a first r-TWT SP associated with a first BSS and transmitting second coordinated r-TWT signaling information indicating a second r-TWT SP associated with a second BSS based on the first r-TWT SP. In some aspects, the first r-TWT SP may be orthogonal to the second r-TWT SP in time.

In some other aspects, the first r-TWT SP may overlap the second r-TWT SP in time. In some implementations, the first coordinated r-TWT signaling information may indicate a transmit power associated with communications in the first BSS during the first r-TWT SP and the second coordinated r-TWT signaling information may indicate a transmit power associated with communications in the second BSS during the second r-TWT SP. In some other implementations, the first coordinated r-TWT signaling information may indicate an allocation of first frequency resources for communications in the first BSS during the first r-TWT SP and the second coordinated r-TWT signaling information may indicate an allocation of second frequency resources for communications in the second BSS during the second r-TWT SP. In such implementations, the first frequency resources may be orthogonal to the second frequency resources.

In some implementations, the first coordinated r-TWT signaling information and the second coordinated r-TWT signaling information may be carried in a broadcast TWT IE included in one or more packets transmitted by the wireless communication device. In some other implementations, the first coordinated r-TWT signaling information and the second coordinated r-TWT signaling information may be carried in first and second coordinated r-TWT IEs, respectively, included in one or more packets transmitted by the wireless communication device.

In some aspects, the method may further include transmitting r-TWT schedule information indicating a third r-TWT SP associated with a third BSS associated with the wireless communication device based on the first r-TWT SP and the second r-TWT SP; and communicating with one or more STAs during the third r-TWT SP based on a respective latency requirement of each of the one or more STAs.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including transmitting first coordinated r-TWT signaling information indicating a first r-TWT SP associated with a first BSS and transmitting second coordinated r-TWT signaling information indicating a second r-TWT SP associated with a second BSS based on the first r-TWT SP.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
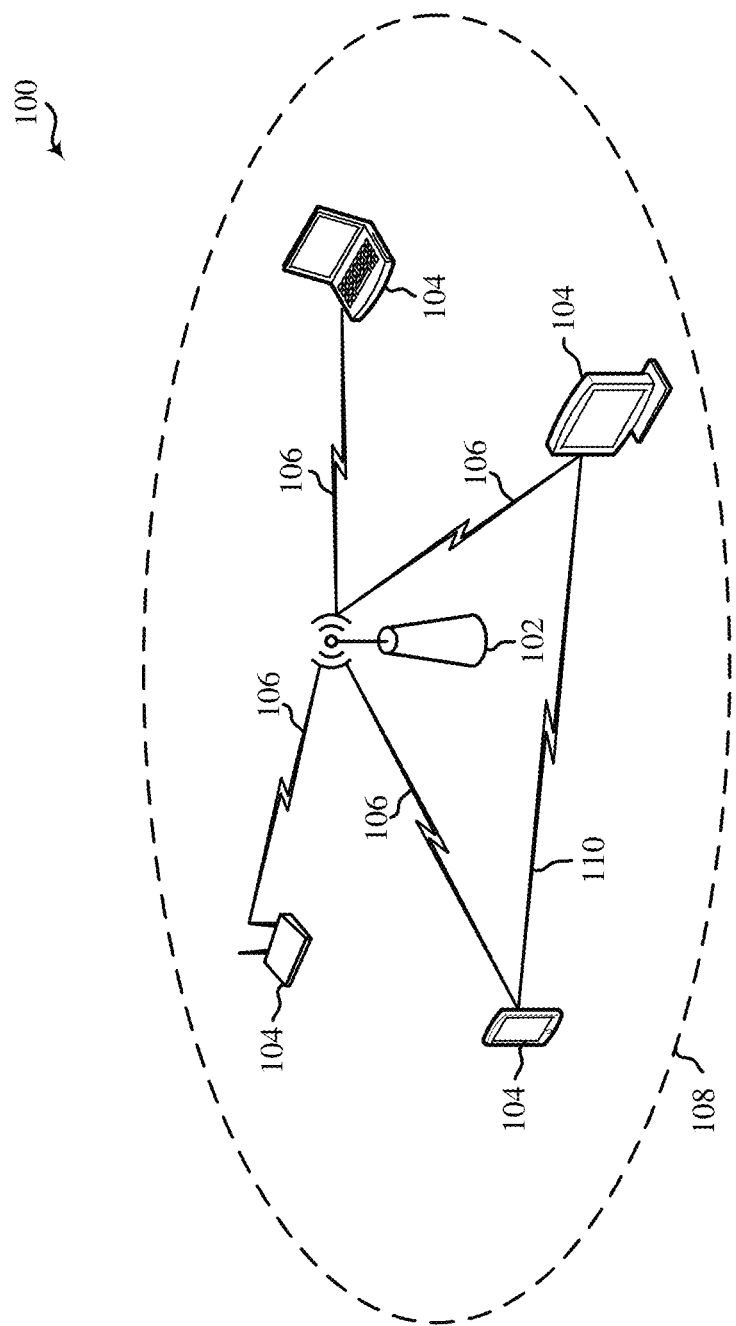
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

The IEEE 802.11be amendment of the IEEE 802.11 standard describes a restricted target wake time (r-TWT) service period (SP) that can be allocated for latency-sensitive traffic. As used herein, the term "non-legacy STA" refers to any wireless station (STA) that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and acquire transmit opportunities (TXOPs) outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. As such, r-TWT SPs can provide more predictable latency, reduced worst case latency, or reduced jitter, with higher reliability for latency-sensitive traffic.

Aspects of the present disclosure recognize that overlapping basic service sets (OBSSs) exist in many wireless communication environments, particularly in dense or crowded environments. An OBSS is any basic service set (BSS) having an overlapping coverage area, and operating on the same wireless channel, as another BSS. As such, wireless communications in a given BSS may interfere or collide with wireless communications in an OBSS, resulting in increased latency of communications in the BSS, the OBSS, or both. Wireless communication devices (including access points (APs) and STAs) that operate in accordance with existing versions of the IEEE 802.11 standard (including an initial release (R1) of the IEEE 802.11be amendment) may not be aware of latency-sensitive traffic in an OBSS.

Accordingly, new communication protocols and signaling are needed to prevent latency-sensitive traffic in a given BSS from interfering or colliding with latency sensitive-traffic in an OBSS.

Various aspects relate generally to protecting latency-sensitive communications during r-TWT SPs, and more particularly, to coordinated scheduling of r-TWT SPs between OBSSs. In some aspects, a first AP may coordinate with a second AP in scheduling r-TWT SPs so that latency-sensitive traffic in a first BSS does not interfere or collide with latency-sensitive traffic in a second BSS overlapping the first BSS. In some implementations, the first and second APs may schedule their respective r-TWT SPs to be orthogonal in time. In some other implementations, the first and second APs may schedule their r-TWT SPs to overlap in time, while allocating coordinated resources to concurrent or overlapping latency-sensitive traffic in the first and second BSSs (such as in accordance with one or more multi-AP coordination techniques). In some aspects, the coordinated r-TWT SPs may be scheduled by a central coordinator (such as an AP or a network controller). For example, the central coordinator may communicate coordinated r-TWT SP schedules to each of the first and second APs. In some other aspects, the coordinated r-TWT SPs may be scheduled in a distributed manner. For example, the first AP may communicate its r-TWT SP schedule to the second AP, and the second AP may schedule its r-TWT SPs based on the r-TWT SP schedule of the first AP.

Particular implementations of the subject matter described in this disclosure can be implemented to realize one or more of the following potential advantages. By scheduling r-TWT SPs in a coordinated manner between multiple APs belonging to OBSSs, aspects of the present disclosure may significantly improve the latency gains achievable by latency-sensitive traffic through application of r-TWT SPs. As described above, concurrent data transmissions in OBSSs may interfere or collide with one another, thereby increasing the latency of communications in such OBSSs. By scheduling r-TWT SPs that are orthogonal in time, aspects of the present disclosure may ensure that latency-sensitive data transmissions in a given BSSs occur at different times than latency-sensitive data transmissions in an OBSS, thereby avoiding interference or collision between OBSSs. By allocating coordinated resources to latency-sensitive traffic in different OBSSs, aspects of the present disclosure may allow concurrent transmissions of latency-sensitive traffic (such as at relatively low powers or on orthogonal time or frequency resources) within the same or shared r-TWT SPs. Thus, as a result of coordinated scheduling, r-TWT SPs may provide more predictable latency, reduced worst case latency, or reduced jitter, with higher reliability for latency-sensitive traffic in OBSSs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
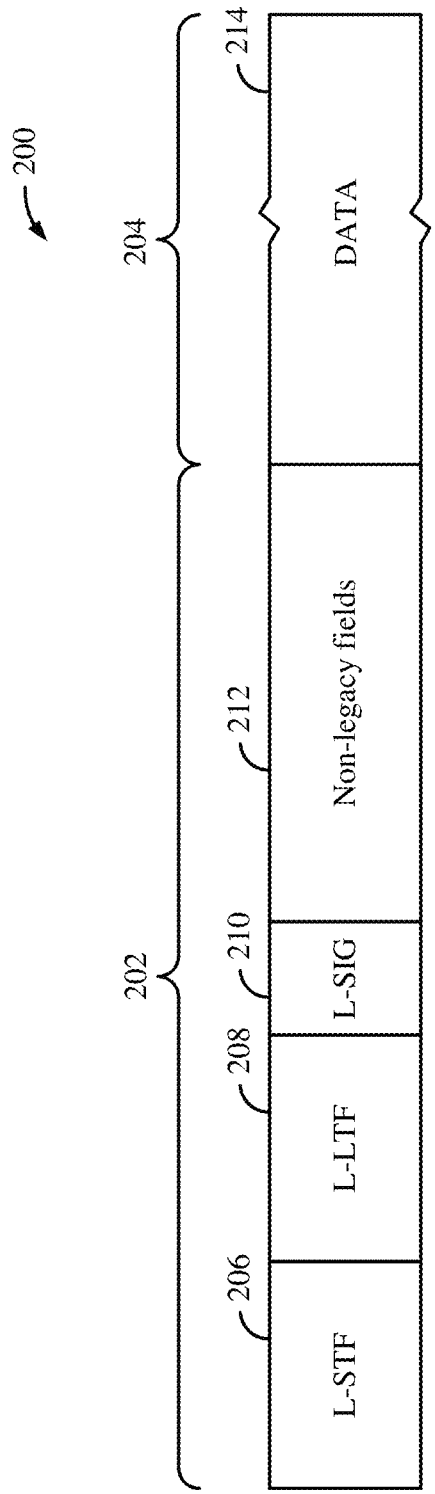
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
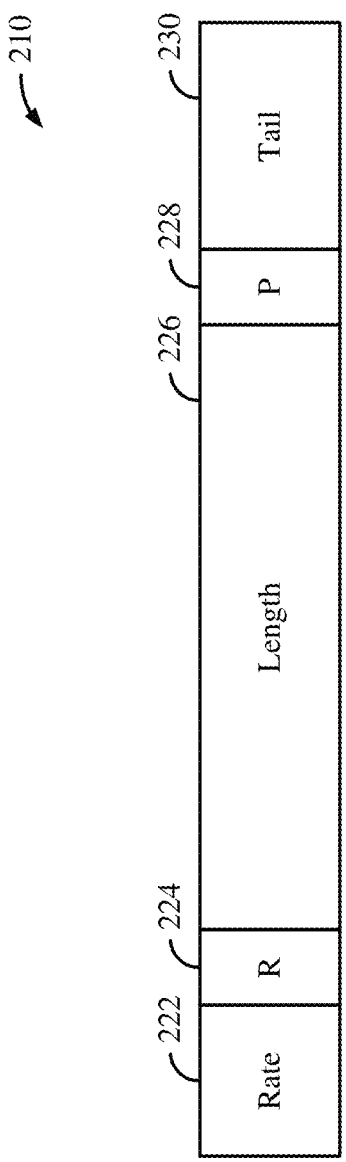
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
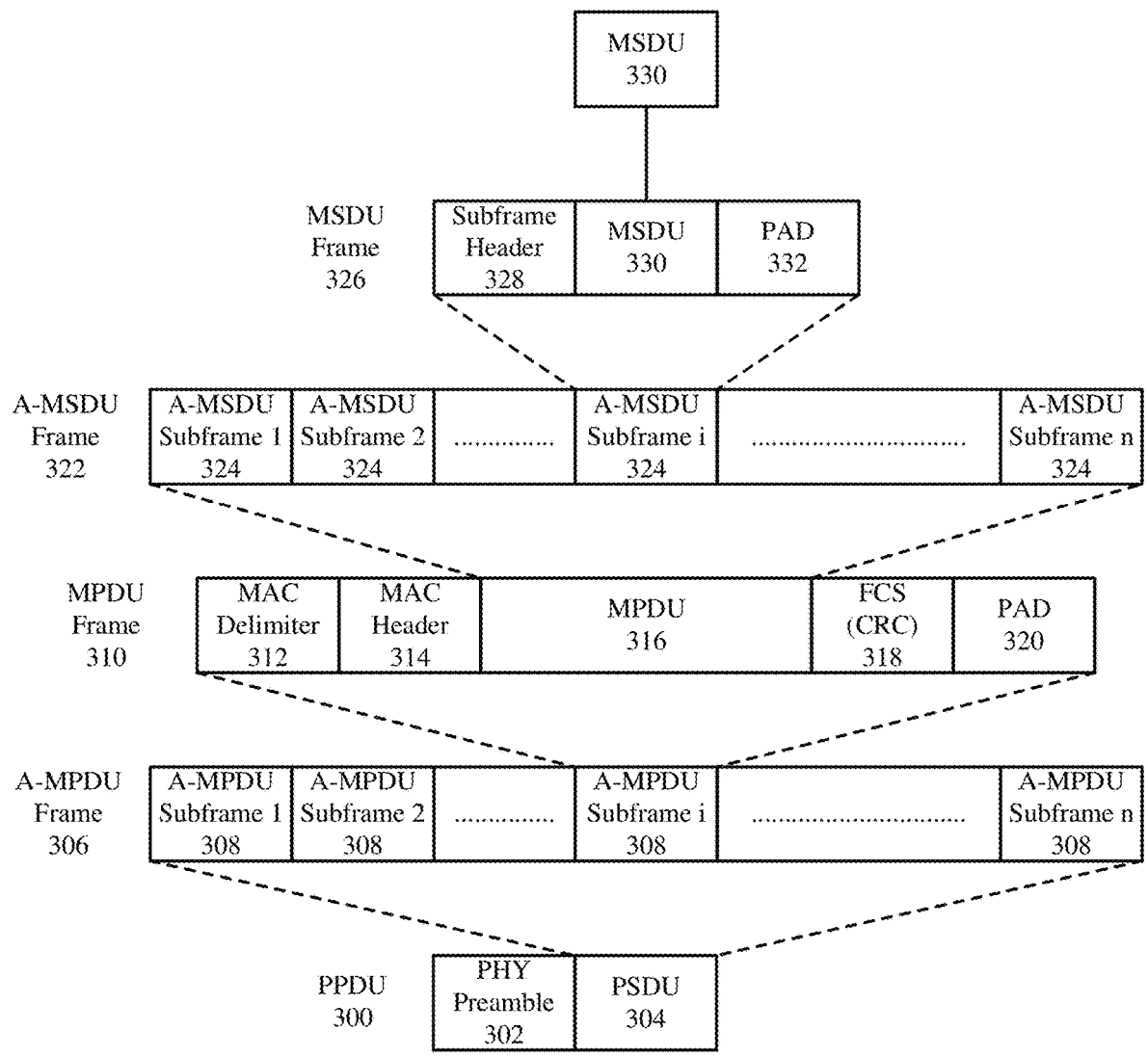
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
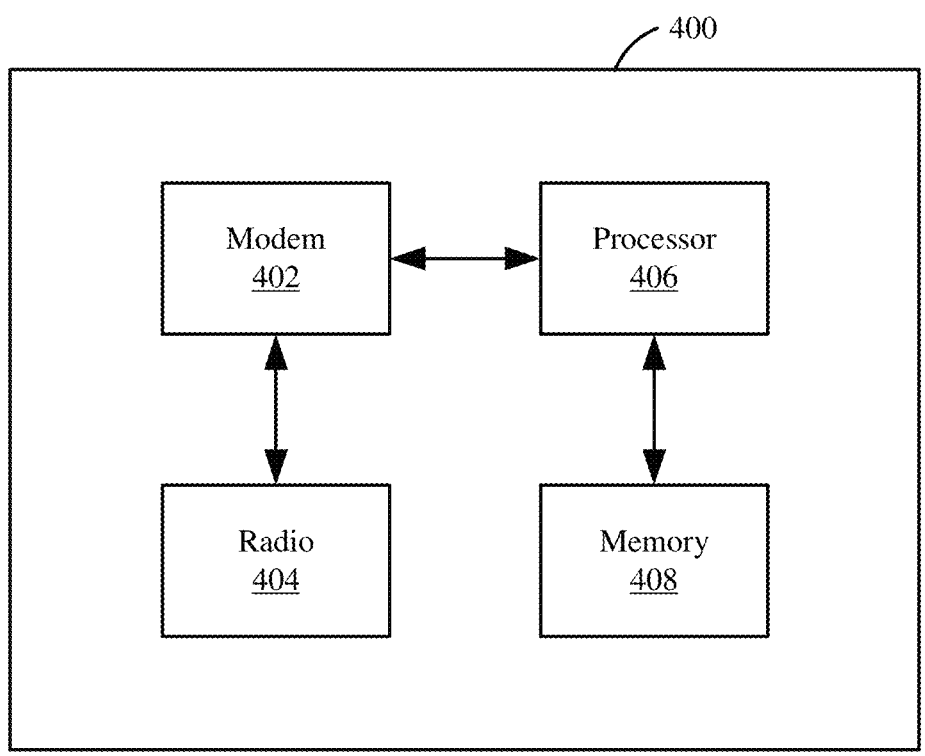
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
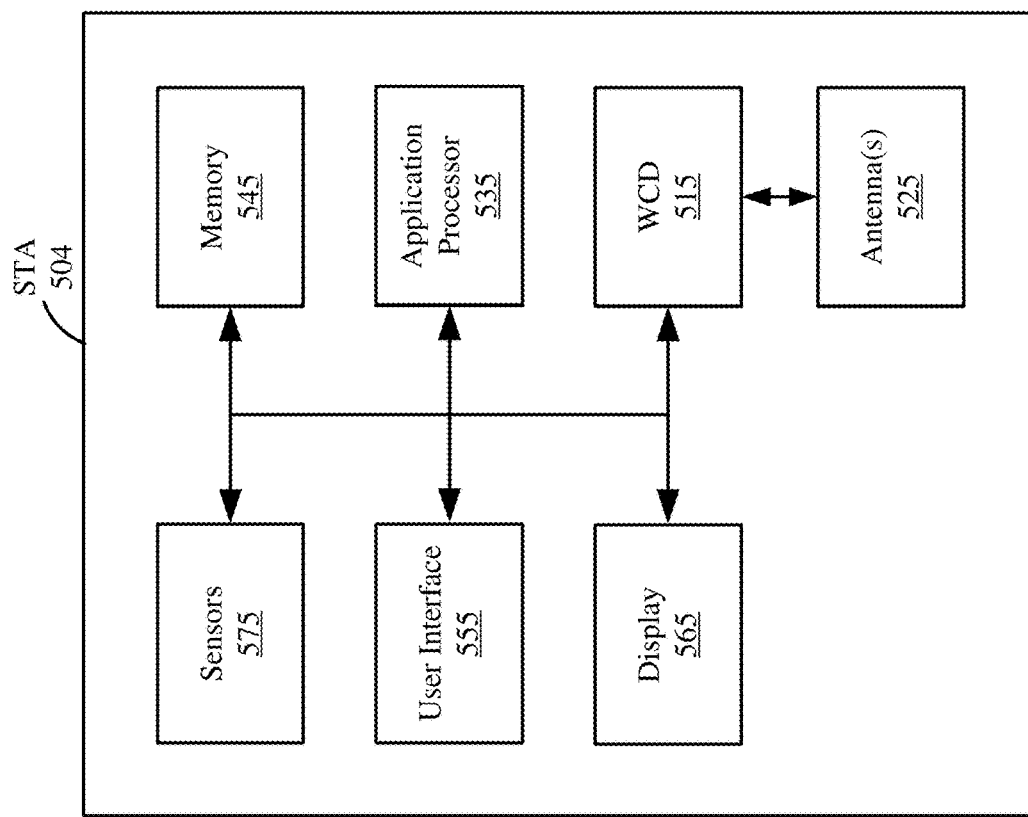
FIG. 5B shows a block diagram of an example STA.
Figure 5A:
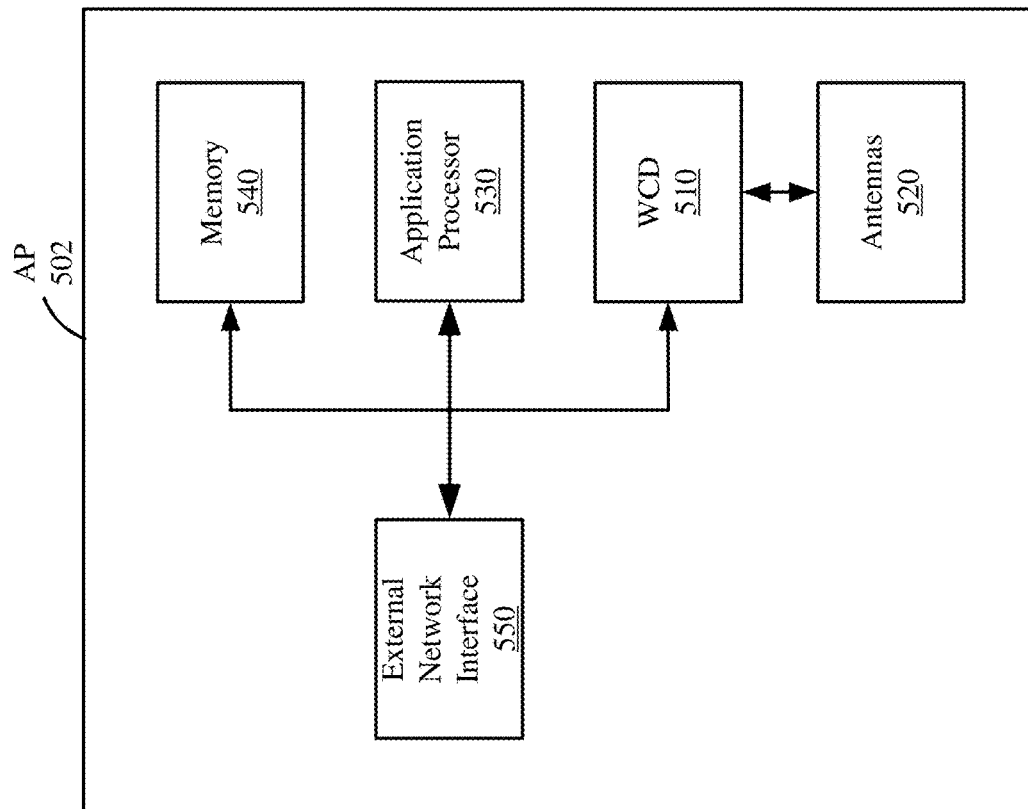
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

The IEEE 802.11be amendment of the IEEE 802.11 standard describes a restricted target wake time (r-TWT) service period (SP) that can be allocated for latency-sensitive traffic. As used herein, the term "non-legacy STA" refers to any STA that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and acquire TXOPs outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. As such, r-TWT SPs can provide more predictable latency, reduced worst case latency, or reduced jitter, with higher reliability for latency-sensitive traffic.

Figure 6:
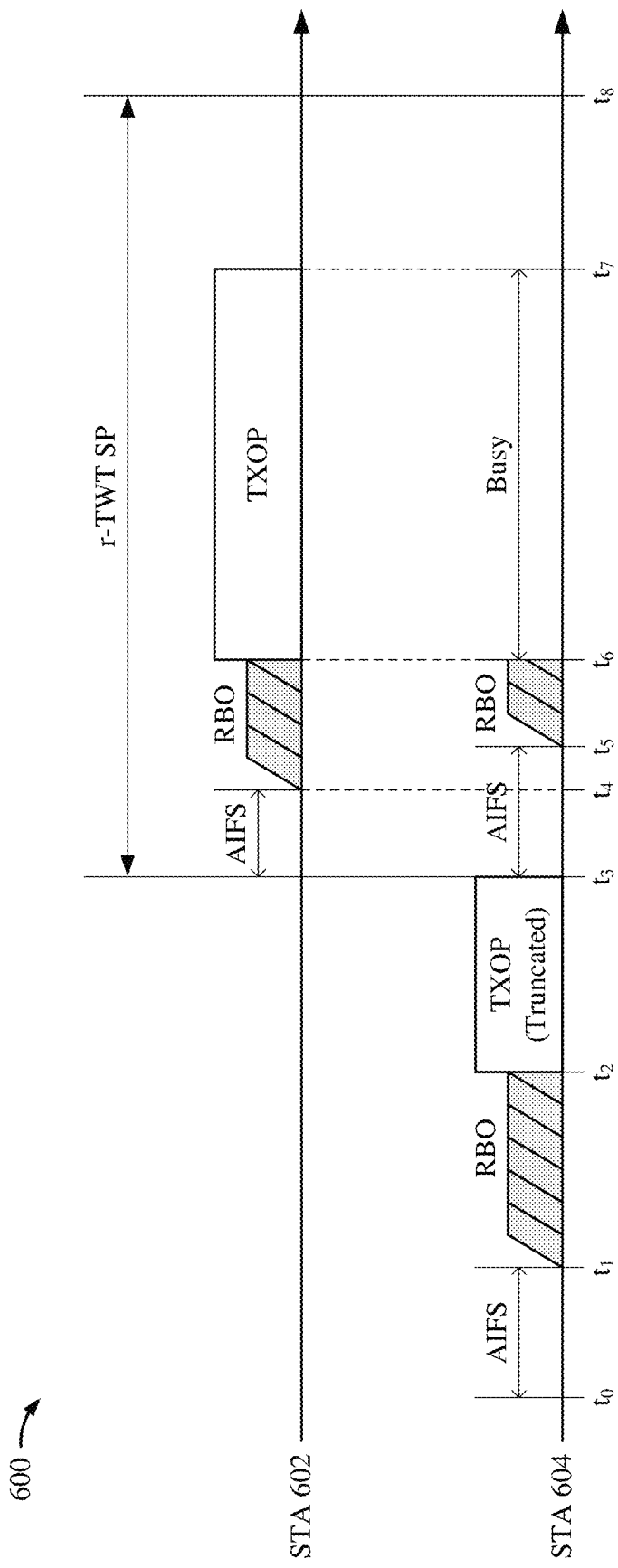
FIG. 6 shows a timing diagram depicting example wireless communications associated with a basic service set (BSS) that supports restricted target wake time (r-TWT) operation.

FIG. 6 shows a timing diagram 600 depicting example wireless communications associated with a BSS that supports r-TWT operation. In the example of FIG. 6, the BSS may include multiple non-legacy STAs 602 and 604 that support r-TWT operation. More specifically, the STA 602 may be a low-latency STA that is a member of an r-TWT SP, which spans a duration from times $t_3$ to $t_8$, whereas the STA 604 may be a non-member STA. In some implementations, each of the STAs 602 and 604 may be one example of any of the STAs 104 or 504 of FIGS. 1 and 5B, respectively. Although two non-legacy STAs 602 and 604 are shown in the example of FIG. 6 in actual implementations, the BSS may include any number of legacy or non-legacy STAs.

The non-member STA 604 attempts to access a shared wireless channel prior to the start of the r-TWT SP. More specifically, the non-member STA 604 senses that the channel is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-member STA 604 senses that the wireless channel is still idle and proceeds to acquire a TXOP, for example, by initiating a transmission over the shared channel. In the example of FIG. 6, the desired TXOP may be longer than the duration remaining before the start of the r-TWT SP at time $t_3$. However, because the existing rules regarding r-TWT operation require non-member STAs to terminate their TXOPs by the start of an r-TWT SP, the non-member STA 604 must truncate its TXOP between times $t_2$ to $t_3$.

The low-latency STA 602 attempts to access the shared wireless channel at the start of the r-TWT SP. In the example of FIG. 6, the low-latency STA 602 senses that the channel is idle for an AIFS duration, from times $t_3$ to $t_4$, and further counts down an RBO duration, from times $t_4$ to $t_6$, before attempting to acquire a TXOP. As shown in FIG. 6, the non-member STA 604 also attempts to access the shared wireless channel at the start of the r-TWT SP. For example, the non-member STA 604 senses that the channel is idle for an AIFS duration, from times $t_3$ to $t_5$, and further counts down an RBO duration beginning at time $t_5$. In some implementations, the data traffic associated with the low-latency STA 602 may be assigned to a higher-priority AC than the data traffic associated with the non-member STA 604. As such, the AIFS or RBO durations associated with the low-latency STA 602 may be shorter than the AIFS or RBO durations, respectively, associated with the non-member STA 604. As a result, the low-latency STA 602 wins access to the wireless channel, at time $t_6$, and acquires a TXOP, for example, by initiating a transmission over the shared channel.

The non-member STA 604 senses that the wireless channel is busy, at time $t_6$, and refrains from accessing the shared channel for the duration of the TXOP (from times $t_6$ to $t_7$). After the TXOP has terminated, at time $t_7$, the non-member STA 604 may once again attempt to access the wireless channel. In this manner, the r-TWT operation may prioritize latency-sensitive traffic in the BSS, for example, by requiring non-member STAs to terminate their TXOPs by the start of any r-TWT SPs of which they are not members. Additionally, an AP (not shown for simplicity) may suppress all traffic from legacy STAs associated with the BSS by scheduling a quiet interval to overlap with at least a portion of the r-TWT SP (such as one or more time-units (TUs) following time $t_3$). For example, the duration of the quiet interval may be indicated by one or more quiet elements included in management frames (such as beacon frames and probe response frames) transmitted by the AP prior to the start of the r-TWT SP.

As described above, OBSSs exist in many wireless communication environments, particularly in dense or crowded environments. An OBSS is any BSS having an overlapping coverage area, and operating on the same wireless channel, as another BSS. As such, wireless communications in a given BSS may interfere or collide with wireless communications in an OBSS, resulting in increased latency of communications in the BSS, the OBSS, or both. Wireless communication devices (including APs and STAs) that operate in accordance with existing versions of the IEEE 802.11 standard (including an initial release (R1) of the IEEE 802.11be amendment) may not be aware of latency-sensitive traffic in an OBSS. Accordingly, new communication protocols and signaling are needed to prevent latency-sensitive traffic in a given BSS from interfering or colliding with latency sensitive-traffic in an OBSS.

Various aspects relate generally to latency-sensitive communications, and more particularly, to coordinating latency-sensitive communications among OBSSs. In some aspects, a first AP may coordinate with a second AP in scheduling r-TWT SPs so that latency-sensitive traffic in a first BSS does not interfere or collide with latency-sensitive traffic in a second BSS overlapping the first BSS. In some implementations, the first and second APs may schedule their respective r-TWT SPs to be orthogonal in time. In some other implementations, the first and second APs may schedule their r-TWT SPs to overlap in time, while allocating coordinated resources to concurrent or overlapping latency-sensitive traffic in the first and second BSSs (such as in accordance with one or more multi-AP coordination techniques). In some aspects, the coordinated r-TWT SPs may be scheduled by a central coordinator (such as an AP or a network controller). For example, the central coordinator may communicate coordinated r-TWT SP schedules to each of the first and second APs. In some other aspects, the coordinated r-TWT SPs may be scheduled in a distributed manner. For example, the first AP may communicate its r-TWT SP schedule to the second AP, and the second AP may schedule its r-TWT SPs based on the r-TWT SP schedule of the first AP.

Particular implementations of the subject matter described in this disclosure can be implemented to realize one or more of the following potential advantages. By scheduling r-TWT SPs in a coordinated manner between multiple APs belonging to OBSSs, aspects of the present disclosure may significantly improve the latency gains achievable by latency-sensitive traffic through application of r-TWT SPs. As described above, concurrent data transmissions in OBSSs may interfere or collide with one another, thereby increasing the latency of communications in such OBSSs. By scheduling r-TWT SPs that are orthogonal in time, aspects of the present disclosure may ensure that latency-sensitive data transmissions in a given BSSs occur at different times than latency-sensitive data transmissions in an OBSS, thereby avoiding interference or collision between OBSSs. By allocating coordinated resources to latency-sensitive traffic in different OBSSs, aspects of the present disclosure may allow concurrent transmissions of latency-sensitive traffic (such as at relatively low powers or on orthogonal time or frequency resources) within the same or shared r-TWT SPs. Thus, as a result of coordinated scheduling, r-TWT SPs may provide more predictable latency, reduced worst case latency, or reduced jitter, with higher reliability for latency-sensitive traffic in OBSSs.

Figure 7:
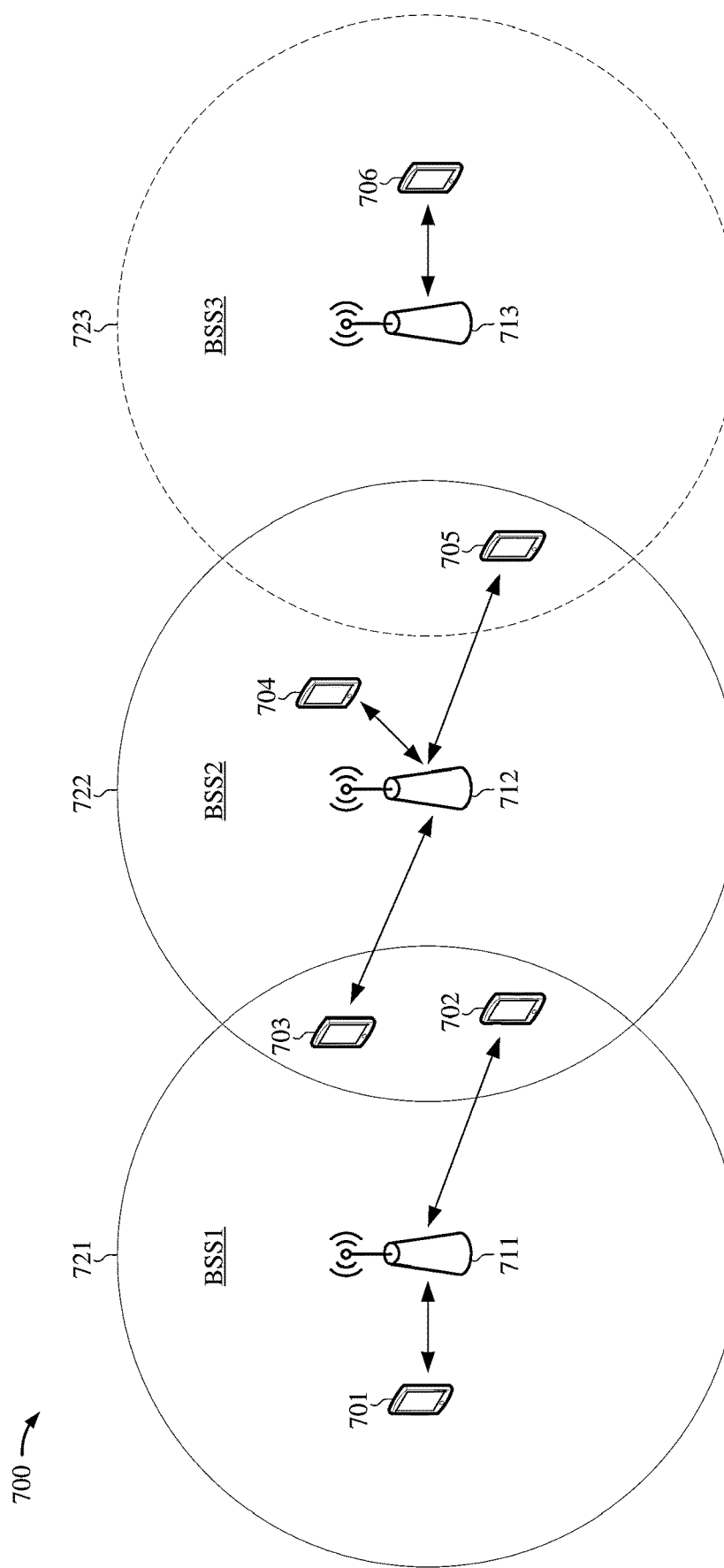
FIG. 7 shows an example communication environment with overlapping basic service sets (OBSSs) according to some implementations.

FIG. 7 shows an example communication environment 700 with OBSSs according to some implementations. More specifically, the example communication environment 700 includes a number of STAs 701-706 and a number of APs 711-713. In some implementations, each of the STAs 701-706 may be one example of any of the STAs 104 or 504 of FIGS. 1 and 5B, respectively. In some implementations, each of the APs 711-713 may be one example of any of the APs 102 or 502 of FIGS. 1 and 5A, respectively. The APs 711-713 may represent BSSs (BSS1-BSS3) having coverage areas 711-713, respectively.

As shown in FIG. 7, the STAs 701 and 702 are associated with the AP 711 (or BSS1) and located within the coverage area 721, the STAs 703-705 are associated with the AP 712 (or BSS2) and located within the coverage area 722, and the STA 706 is associated with the AP 713 (or BSS3) and located within the coverage area 723. In the example of FIG. 7, each of the APs 711-713 may be configured to operate on the same wireless channel. Further, the APs 711 and 712 have overlapping coverage areas 721 and 722, respectively. Thus, the APs 711 and 712 represent OBSSs. Similarly, the APs 712 and 713 have overlapping coverage areas 722 and 723, respectively. Thus, the APs 712 and 713 represent OBSSs.

In some aspects, each of the STAs 701-706 and each of the APs 711-713 may support r-TWT operation. More specifically, the AP 711 may schedule one or more r-TWT SPs that can be used by its associated STAs 701 and 702 to communicate latency-sensitive traffic, the AP 712 may schedule one or more r-TWT SPs that can be used by its associated STAs 703-705 to communicate latency-sensitive traffic, and the AP 713 may schedule one or more r-TWT SPs that can be used by its associated STA 706 to communicate latency-sensitive traffic. Because BSS2 overlaps with BSS1 and BSS3, wireless communications in BSS2 can interfere or collide with wireless communications in any of BSS1 or BSS3. Similarly, wireless communications in any of BSS1 or BSS3 can interfere or collide with wireless communications in BSS2.

In some aspects, the APs 711 and 712 may coordinate the scheduling of their respective r-TWT SPs to avoid interference or collisions between latency-sensitive data traffic in BSS1 and latency-sensitive data traffic in BSS2. As such, the APs 711 and 712 may be referred to herein as "r-TWT coordinating APs." In some implementations, the APs 711 and 712 may schedule their respective r-TWT SPs to be orthogonal in time. For example, the AP 711 may schedule one or more r-TWT SPs to occur during periods of time that do not overlap with any r-TWT SPs scheduled by the AP 712. Similarly, the AP 712 may schedule one or more r-TWT SPs to occur during periods of time that do not overlap with any r-TWT SPs scheduled by the AP 711. In some other implementations, the APs 711 and 712 may schedule their r-TWT SPs to overlap in time, while allocating coordinated resources to concurrent or overlapping latency-sensitive traffic in BSS1 and BSS2 (such as using one or more multi-AP coordination techniques). For example, within the same or overlapping r-TWT SPs, latency-sensitive traffic may be transmitted at a relatively low power or on different time or frequency resources across BSS1 and BSS2.

In some aspects, the coordinated r-TWT SPs may be scheduled by a central coordinator. For example, the central coordinator may schedule r-TWT SPs for each of the APs 711 and 712 and may communicate the r-TWT SP schedules to the APs 711 and 712 via coordinated r-TWT signaling. In some implementations, the central coordinator may be an AP such as, for example, one of the APs 711 or 712. In some other implementations, the central coordinator may be a network controller that communicates with the APs 711 and 712 via a (wired or wireless) backhaul. In some other aspects, the coordinated r-TWT SPs may be scheduled in a distributed manner. For example, the AP 711 may communicate its r-TWT SP schedule to the AP 712, and the AP 712 may schedule its r-TWT SPs based on the r-TWT SP schedule of the AP 711. In some implementations, the AP 711 may "explicitly" signal its r-TWT SP schedule to the AP 712 via a wired backhaul or in one or more packets transmitted to (or intended for reception by) the AP 712. In some other implementations, the AP 711 may "implicitly" signal its r-TWT SP schedule to the AP 712. In such implementations, the AP 712 may acquire the r-TWT SP schedule of the AP 711 by intercepting one or more packets transmitted by the AP 711 to its associated STAs (such as the STAs 701 or 702).

In some implementations, each of the r-TWT coordinating APs 711 and 712 may transmit or broadcast coordinated r-TWT signaling information to other APs or STAs in its vicinity. For example, the AP 711 may broadcast its r-TWT SP schedule as well as the r-TWT SP schedule of the AP 712 to its associated STAs 701 and 702 and to any other APs within wireless communication range. Accordingly, the STAs 701 and 702 (and other APs) may schedule their latency-sensitive communications to coincide with the r-TWT SPs of the AP 711 while avoiding the r-TWT SPs of the AP 712. Similarly, the AP 712 may broadcast its r-TWT SP schedule as well as the r-TWT SP schedule of the AP 711 to its associated STAs 703-705 and to any other APs within wireless communication range. Accordingly, the STAs 703-705 may schedule their latency-sensitive communications to coincide with the r-TWT SPs of the AP 712 while avoiding the r-TWT SPs of the AP 711.

In some aspects, the AP 713 may not coordinate the scheduling of its r-TWT SPs with the AP 712 (or may not support coordinated r-TWT scheduling). As such, the AP 713 may be referred to herein as an "r-TWT non-coordinating AP." In some implementations, the AP 712 may acquire the r-TWT SP schedule of the AP 713 by intercepting beacon frames, management frames, or other packets transmitted by the AP 713 to its associated STAs (such as the STA 706). Accordingly, the AP 712 may schedule its r-TWT SPs based on the r-TWT SP schedule of the AP 713. In some implementations, the AP 712 may schedule its r-TWT SPs to be orthogonal in time to (or otherwise avoid) any r-TWT SPs scheduled by the AP 713. In some other implementations, the AP 712 may utilize other information associated with the AP 713, in addition to the r-TWT SP schedule of the AP 713, in scheduling its own r-TWT SPs. For example, the AP 712 may assess a level of interference from the AP 713 based on a received signal strength indication (RSSI) of wireless signals received from the AP 713 and may adjust the transmit power or timing of latency-sensitive traffic in BSS2 to avoid interference or collisions with latency-sensitive traffic in BSS3.

In some other aspects, the AP 713 may be hidden from (or otherwise undetectable by) the AP 712. In some implementations, the AP 712 may acquire the r-TWT SP schedule of the AP 713 from one or more associated STAs located within the coverage area 723 of the AP 713 (such as the STA 705). For example, the STA 705 may intercept one or more beacon frames, management frames, or other packets transmitted by the AP 713 to its associated STAs (such as the STA 706). The STA 705 may parse the intercepted packets for r-TWT schedule information indicating the r-TWT SP schedule of the AP 713 and relay the r-TWT SP schedule to the AP 712. Accordingly, the AP 712 may schedule its r-TWT SPs based on the r-TWT SP schedule of the AP 713. In some implementations, the AP 712 may schedule its r-TWT SPs to be orthogonal in time to (or otherwise avoid) any r-TWT SPs scheduled by the AP 713. In some other implementations, the AP 712 may utilize other information associated with the AP 713 (such as an RSSI of wireless signals received from the AP 713), in addition to the r-TWT SP schedule of the AP 713, in scheduling its own r-TWT SPs. For example, the AP 712 may adjust the transmit power or timing of latency-sensitive traffic in BSS2 to avoid interference or collisions with latency-sensitive traffic in BSS3.

Figure 8:
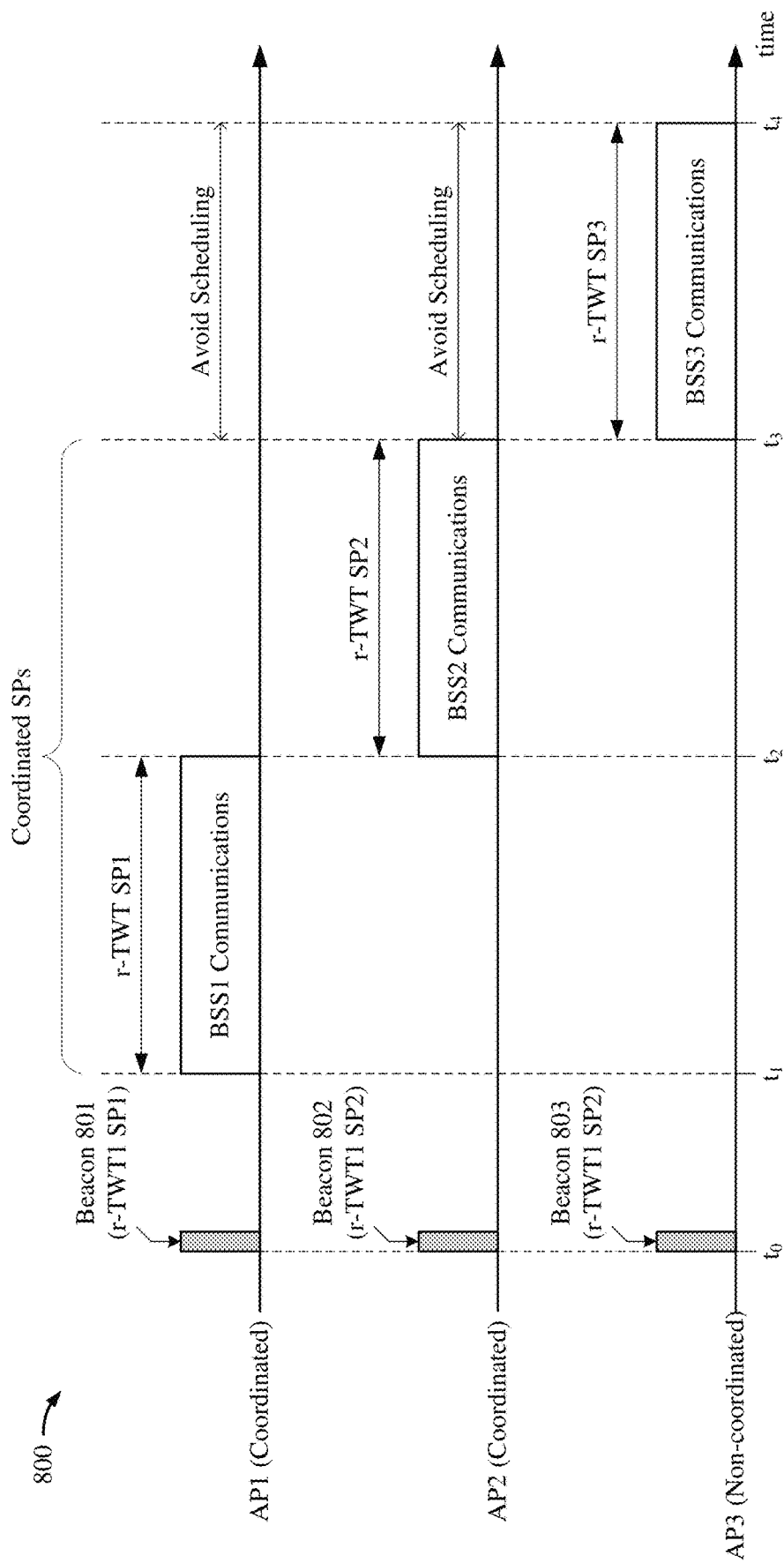
FIG. 8 shows a timing diagram depicting example wireless communications associated with OBSSs that support r-TWT operation, according to some implementations.

FIG. 8 shows a timing diagram 800 depicting example wireless communications associated with OBSSs (BSS1-BSS3) that support r-TWT operation, according to some implementations. In the example of FIG. 8, BSS1, BSS2, and BSS3 are represented by access points AP1, AP2, and AP3, respectively. In some implementations, the access points AP1, AP2, and AP3 may be examples of the APs 711, 712, and 713, respectively, of FIG. 7. As shown in FIG. 8, the access points AP1 and AP2 belong to a coordinated r-TWT scheduling group. As such, the access points AP1 and AP2 may schedule their r-TWT SPs in a coordinated manner so that latency-sensitive data traffic in BSS1 does not interfere or collide with latency-sensitive data traffic in BSS2. In contrast, the access point AP3 does not belong to the coordinated r-TWT scheduling group. As such, the access point AP3 does not schedule its r-TWT SPs in a coordinated manner with any of the access points AP1 or AP2.

In some implementations, the access points AP1 and AP2 may schedule their r-TWT SPs to be orthogonal in time while avoiding any r-TWT SPs scheduled by the access point AP3. As shown in FIG. 8, the access point AP3 schedules an r-TWT SP (r-TWT SP3) to occur from times $t_3$ to $t_4$. Accordingly, the access points AP1 and AP2 may avoid scheduling any of their r-TWT SPs to occur between $t_3$ and $t_4$. In the example of FIG. 8, the access point AP1 schedules an r-TWT SP (r-TWT SP1) to occur from times $t_1$ to $t_2$ and the access point AP2 schedules an r-TWT SP (r-TWT SP2) to occur from times $t_2$ to $t_3$. In some implementations, each of the service periods r-TWT SP1, r-TWT SP2, and r-TWT SP3 may be one example of the r-TWT SP shown in FIG. 6 (from times $t_3$ to $t_8$). Accordingly, the first access point AP1 may communicate latency-sensitive data with one or more low-latency STAs in BSS1 during r-TWT SP1, the second access point AP2 may communicate latency-sensitive data with one or more low-latency STAs in BSS2 during r-TWT SP2, and the third access point AP3 may communicate latency-sensitive data with one or more low-latency STAs in BSS3 during r-TWT SP3.

Aspects of the present disclosure recognize that STAs located at the edge of an AP's coverage area (such as the STAs 702, 703 and 705 of FIG. 7) are more susceptible to interference from an OBSS than STAs located closer to the AP. Thus, allocating such STAs to r-TWT SPs that are orthogonal in time may significantly improve the quality of their latency-sensitive data communications compared to other means of coordinated r-TWT scheduling. In some aspects, each of the access points AP1, AP2, and AP3 may assign or otherwise allocate low-latency STAs to the service periods r-TWT SP1, r-TWT SP2, and r-TWT SP3, respectively, based on r-TWT schedule information carried in beacon or other management frames transmitted prior to (or during) one or more r-TWT SPs. In some implementations, the r-TWT schedule information associated with a particular r-TWT SP may assign one or more STAs to that r-TWT SP. In some other implementations, a STA may request to join a particular r-TWT SP responsive to receiving r-TWT schedule information associated with that r-TWT SP.

As shown in FIG. 8, the access point AP1 transmits a beacon frame 801, at time to, carrying r-TWT schedule information indicating the schedule associated with r-TWT SP1. With reference for example to FIG. 7, the beacon frame 801 may be transmitted by the AP 711 and may assign or otherwise allocate the STA 702 to r-TWT SP1. The access point AP2 transmits a beacon frame 802, at time to, carrying r-TWT schedule information indicating the schedule associated with r-TWT SP2. With reference for example to FIG. 7, the beacon frame 802 may be transmitted by the AP 712 and may assign or otherwise allocated one or more of the STAs 703 or 705 to r-TWT SP2. The access point AP3 transmits a beacon frame 803, at time to, carrying r-TWT schedule information indicating the schedule associated with r-TWT SP3. With reference for example to FIG. 7, the beacon frame 803 may assign or otherwise allocate the STA 706 to r-TWT SP3. Although FIG. 8 shows the beacon frames 801-803 being transmitted at the same time (to), in some other implementations, one or more of the beacon frames 801-803 may be transmitted at a different time.

In some implementations, the beacon frames 801 and 802 broadcast by the coordinated access points AP1 and AP2, respectively, may further carry coordinated r-TWT signaling information. As described above, the coordinated r-TWT signaling information may indicate the r-TWT SP schedules associated with one or more OBSSs. For example, the beacon frame 801 may carry coordinated r-TWT signaling information indicating the schedules for one or more of the service periods r-TWT SP2 or r-TWT SP3 and the beacon frame 802 may carry coordinated r-TWT signaling information indicating the schedules for one or more of the service periods r-TWT SP1 or r-TWT SP3. As used herein, the term "schedule" may include timing information, resource allocation information, or various other communication parameters associated with an r-TWT SP. For example, the schedule for r-TWT SP1 may indicate that r-TWT SP1 is to occur from times $t_1$ to $t_2$, the schedule for r-TWT SP2 may indicate that r-TWT SP2 is to occur from times $t_2$ to $t_3$, and the schedule for r-TWT SP3 may indicate that r-TWT SP3 is to occur from times $t_3$ to $t_4$.

Figure 9:
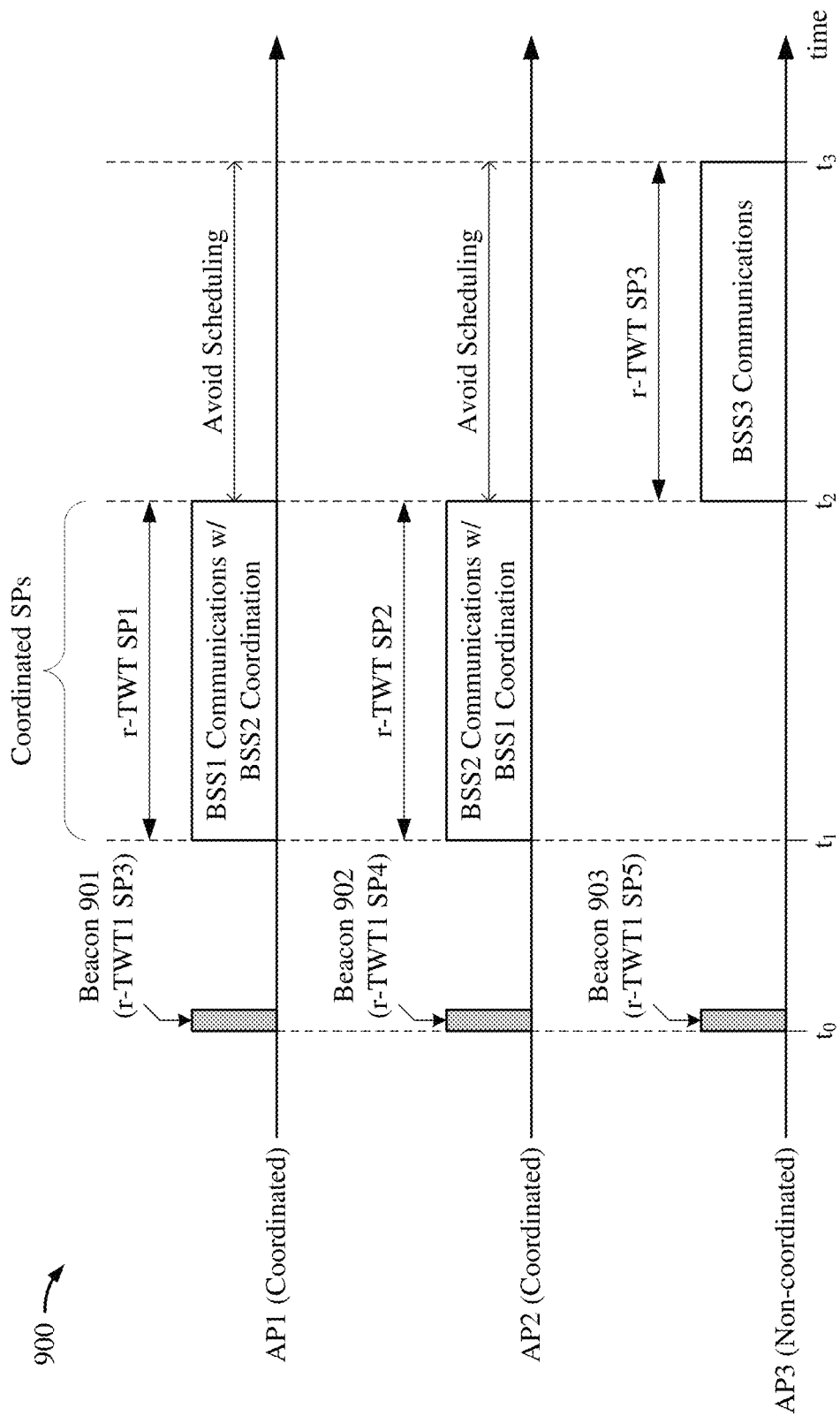
FIG. 9 shows a timing diagram depicting example wireless communications associated with OBSSs that support r-TWT operation, according to some implementations.

FIG. 9 shows a timing diagram 900 depicting example wireless communications associated with OBSSs (BSS1-BSS3) that support r-TWT operation, according to some implementations. In the example of FIG. 9, BSS1, BSS2, and BSS3 are represented by access points AP1, AP2, and AP3, respectively. In some implementations, the access points AP1, AP2, and AP3 may be examples of the APs 711, 712, and 713, respectively, of FIG. 7. As shown in FIG. 9, the access points AP1 and AP2 belong to a coordinated r-TWT scheduling group. As such, the access points AP1 and AP2 may schedule their r-TWT SPs in a coordinated manner so that latency-sensitive data traffic in BSS1 does not interfere or collide with latency-sensitive data traffic in BSS2. In contrast, the access point AP3 does not belong to the coordinated r-TWT scheduling group. As such, the access point AP3 does not schedule its r-TWT SPs in a coordinated manner with any of the access points AP1 or AP2.

In some implementations, the access points AP1 and AP2 may schedule their r-TWT SPs to overlap in time while avoiding any r-TWT SPs scheduled by the access point AP3.

As shown in FIG. 9, the access point AP3 schedules an r-TWT SP (r-TWT SP3) to occur from times $t_2$ to $t_3$. Accordingly, the access points AP1 and AP2 may avoid scheduling any of their r-TWT SPs to occur between $t_2$ and $t_3$. In the example of FIG. 9, the access points AP1 and AP2 schedule respective r-TWT SPs (r-TWT SP1 and r-TWT SP2) to occur from times $t_1$ to $t_2$. In some implementations, each of the service periods r-TWT SP1, r-TWT SP2, and r-TWT SP3 may be one example of the r-TWT SP shown in FIG. 6 (from times $t_3$ to $t_8$). Accordingly, the first access point AP1 may communicate latency-sensitive data with one or more low-latency STAs in BSS1 during r-TWT SP1, the second access point AP2 may communicate latency-sensitive data with one or more low-latency STAs in BSS2 during r-TWT SP2, and the third access point AP3 may communicate latency-sensitive data with one or more low-latency STAs in BSS3 during r-TWT SP3.

In some aspects, the access points AP1 and AP2 may coordinate their allocation of resources for wireless communications during the overlapping service periods r-TWT SP1 and r-TWT SP2 to prevent latency-sensitive traffic in BSS1 from interfering or colliding with latency-sensitive traffic in BSS2. Example suitable resources include, among other examples, transmit power, timing, or frequency allocations for latency-sensitive traffic. In some implementations, the access points AP1 and AP2 may coordinate the transmit times of wireless communications in BSS1 and BSS2 during r-TWT SP1 and r-TWT SP2. In such implementations, the timing of latency-sensitive traffic in BSS1 may be orthogonal to the timing of latency-sensitive traffic in BSS2. For example, each of the access points AP1 and AP2 may initiate a TXOP during r-TWT SP1 and r-TWT SP2 by transmitting a multi-user (MU) request-to-send (RTS) frame that solicits concurrent clear-to-send (CTS) frames from multiple STAs, thereby protecting the TXOP from interference by STAs in OBSSs.

In some other implementations, the access points AP1 and AP2 may coordinate the frequency resources (such as RUs) allocated for wireless communications in BSS1 and BSS2 during r-TWT SP1 and r-TWT SP2. In such implementations, the frequency resources allocated for latency-sensitive traffic in BSS1 may be orthogonal to the frequency resources allocated for latency-sensitive traffic in BSS2. For example, prior to (or during) r-TWT SP1 and r-TWT SP2, the access points AP1 and AP2 may exchange coordination information indicating an allocation of frequency resources for wireless communications in at least one of BSS1 or BSS2 (such as in accordance with coordinated OFDMA (C-OFDMA) operation). The access points AP1 and AP2 may utilize the coordination information exchange to propose, accept, or negotiate orthogonal frequency resources to be allocated for wireless communications in BSS1 and BSS2 during the overlapping service periods r-TWT SP1 and r-TWT SP2.

Still further, in some implementations, the access points AP1 and AP2 may coordinate the transmit powers of wireless communications in BSS1 and BSS2 during r-TWT SP1 and r-TWT SP2. In such implementations, the transmit power of latency-sensitive traffic in BSS1 may be suitably low so as not to interfere with latency-sensitive traffic in BSS2 and the transmit power of latency-sensitive traffic in BSS2 may be suitable low so as not to interfere with latency-sensitive traffic in BSS1. For example, prior to (or during) r-TWT SP1 and r-TWT SP2, the access points AP1 and AP2 may exchange coordination information indicating a transmit power to be used for wireless communications in at least one of BSS1 or BSS2 (such as in accordance with coordinated spatial reuse (C-SR) operation). The access points AP1 and AP2 may utilize the coordination information exchange to propose, accept, or negotiate transmit powers to be used for wireless communications in BSS1 and BSS2 during the overlapping service periods r-TWT SP1 and r-TWT SP2.

Aspects of the present disclosure recognize that STAs located close to an AP (such as STAs 701 and 704 of FIG. 7) are more susceptible to interference from an OBSS than STAs located further from the AP. Thus, lowering the transmit power of wireless communications associated with such STAs may effectively suppress interference between OBSSs during overlapping r-TWT SPs. In some aspects, each of the access points AP1, AP2, and AP3 may assign or otherwise allocate low-latency STAs to the service periods r-TWT SP1, r-TWT SP2, and r-TWT SP3, respectively, based on r-TWT schedule information carried in beacon or other management frames transmitted prior to (or during) one or more r-TWT SPs. In some implementations, the r-TWT schedule information associated with a particular r-TWT SP may assign one or more STAs to that r-TWT SP. In some other implementations, a STA may request to join a particular r-TWT SP responsive to receiving r-TWT schedule information associated with that r-TWT SP.

As shown in FIG. 9, the access point AP1 transmits a beacon frame 901, at time to, carrying r-TWT schedule information indicating the schedule associated with r-TWT SP1. With reference for example to FIG. 7, the beacon frame 901 may be transmitted by the AP 711 and may assign or otherwise allocate the STA 701 to r-TWT SP1. The access point AP2 transmits a beacon frame 902, at time to, carrying r-TWT schedule information indicating the schedule associated with r-TWT SP2. With reference for example to FIG. 7, the beacon frame 902 may be transmitted by the AP 712 and may assign or otherwise allocated the STA 704 to r-TWT SP2. The access point AP3 transmits a beacon frame 903, at time to, carrying r-TWT schedule information indicating the schedule associated with r-TWT SP3. With reference for example to FIG. 7, the beacon frame 903 may assign or otherwise allocate the STA 706 to r-TWT SP3. Although FIG. 9 shows the beacon frames 901-903 being transmitted at the same time (to), in some other implementations, one or more of the beacon frames 901-903 may be transmitted at a different time.

In some implementations, the beacon frames 901 and 902 broadcast by the coordinated access points AP1 and AP2, respectively, may further carry coordinated r-TWT signaling information. As described above, the coordinated r-TWT signaling information may indicate the r-TWT SP schedules associated with one or more OBSSs. For example, the beacon frame 901 may carry coordinated r-TWT signaling information indicating the schedules for one or more of the service periods r-TWT SP2 or r-TWT SP3 and the beacon frame 902 may carry coordinated r-TWT signaling information indicating the schedules for one or more of the service periods r-TWT SP1 or r-TWT SP3. More specifically, the schedule for r-TWT SP1 may indicate that r-TWT SP1 is to occur from times $t_1$ to $t_2$, the schedule for r-TWT SP2 may indicate that r-TWT SP2 is also to occur from times $t_1$ to $t_2$, and the schedule for r-TWT SP3 may indicate that r-TWT SP3 is to occur from times $t_2$ to $t_3$.

Figure 10A:
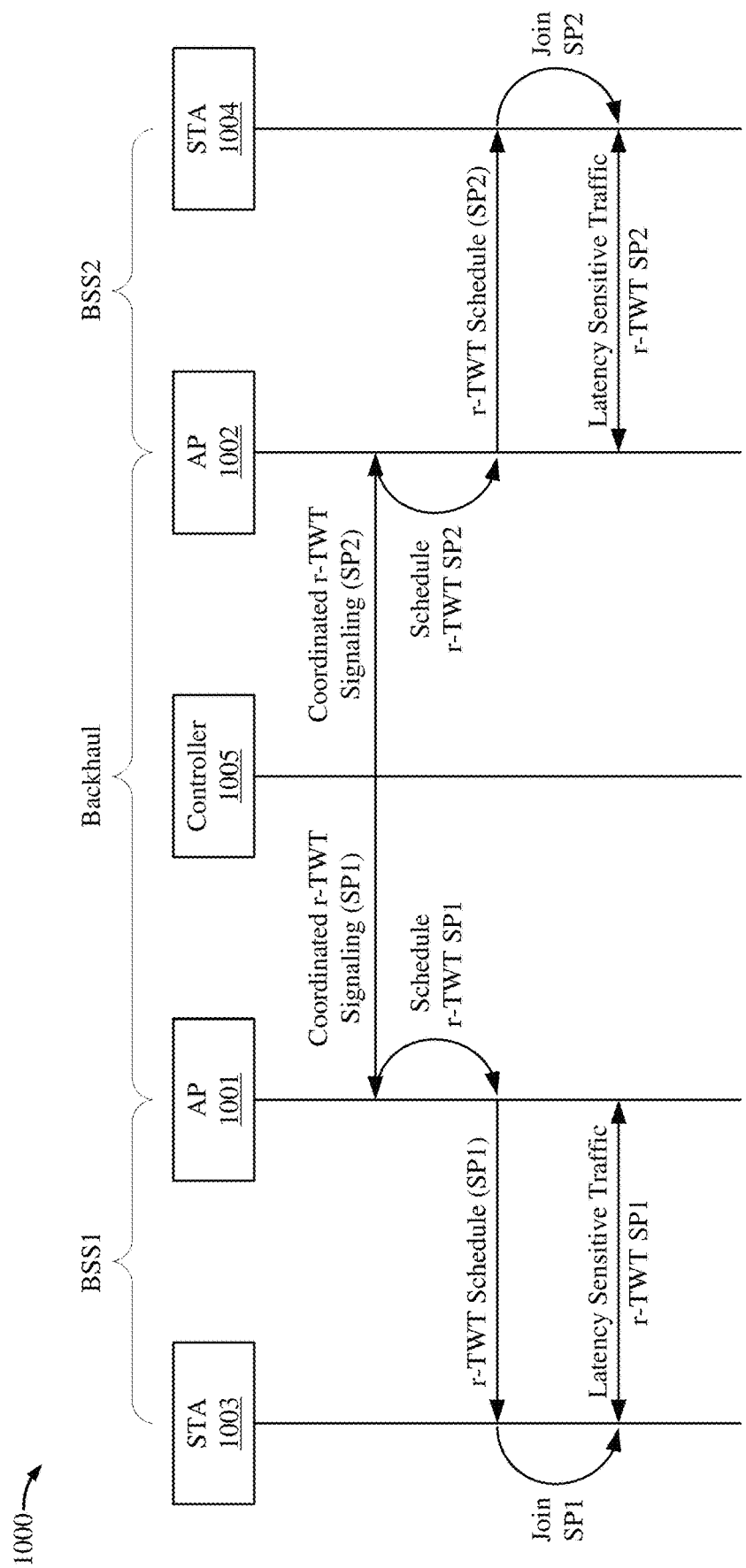
FIG. 10A shows a sequence diagram depicting an example message exchange between OBSSs that support coordinated scheduling of r-TWT service periods (SPs), according to some implementations.

FIG. 10A shows a sequence diagram 1000 depicting an example message exchange between OBSSs (BSS1 and BSS2) that support coordinated scheduling of r-TWT SPs, according to some implementations. As shown in FIG. 10A, BSS1 includes an AP 1001 and a STA 1003, and BSS2 includes an AP 1002 and a STA 1004. In some implementations, each of the APs 1001 and 1002 may be one example of the APs 711 and 712, respectively, of FIG. 7, the STA 1003 may be one example of any of the STAs 701 or 702, and the STA 1004 may be one example of any of the STAs 703-705.

In some aspects, a network controller 1005 may coordinate the scheduling of r-TWT SPs for BSS1 and BSS2 so that latency-sensitive communications in BSS1 do not interfere or collide with latency-sensitive communications in BSS2. For example, the network controller 1005 may be coupled to, or otherwise communicate with, the APs 1001 and 1002 via a (wired or wireless) backhaul. In the example of FIG. 10A, the network controller 1005 may schedule a first r-TWT SP (r-TWT SP1) for BSS1 and a second r-TWT SP (r-TWT SP2) for BSS2. In some implementations, r-TWT SP1 and r-TWT SP2 may be orthogonal in time (such as described with reference to FIG. 8). In some other implementations, r-TWT SP1 and r-TWT SP2 may overlap in time (such as described with reference to FIG. 9). In such implementations, the network controller 1005 may coordinate the allocation of resources (such as transmit power, timing, or frequency allocations) for wireless communications during the overlapping service periods r-TWT SP1 and r-TWT SP2.

The network controller 1005 communicates coordinated r-TWT signaling information to each of the APs 1001 and 1002. More specifically, the coordinated r-TWT signaling information provided to the AP 1001 may include a schedule for r-TWT SP1 and the coordinated r-TWT signaling information provided to the AP 1002 may include a schedule for r-TWT SP2. In some implementations, the coordinated r-TWT signaling information provided to the AP 1001 also may include a schedule for r-TWT SP2 and the coordinated r-TWT signaling information provided to the AP 1002 also may include a schedule for r-TWT SP1.

The AP 1001 schedules r-TWT SP1 based on its received coordinated r-TWT signaling information and transmits or broadcasts r-TWT schedule information indicating the schedule for r-TWT SP1. For example, the r-TWT schedule information may be carried in a broadcast r-TWT information element (IE) included in beacon frames or other management frames transmitted by the AP 1001 to the STA 1003 (such as in accordance with existing versions of the IEEE 802.11 standard). The STA 1003 joins r-TWT SP1 (as a member) responsive to receiving the r-TWT schedule information from the AP 1001. In some implementations, the r-TWT schedule information may assign the STA 1003 to r-TWT SP1. In some other implementations, the STA 1003 may request to join r-TWT SP1 based on the received r-TWT schedule information. Thereafter, the AP 1001 and the STA 1003 may exchange latency-sensitive traffic during r-TWT SP1.

In some aspects, the AP 1001 also may transmit coordinated r-TWT signaling information indicating the schedule for r-TWT SP2. In some implementations, the coordinated r-TWT signaling information may be carried in the broadcast r-TWT IE included in the beacon frames or other management frames transmitted by the AP 1001 to the STA 1003. In some other implementations, the coordinated r-TWT signaling information may be carried in a new coordinated r-TWT IE in the beacon frames or other management frames transmitted by the AP 1001 to the STA 1003. Still further, in some implementations, the coordinated r-TWT signaling information may be carried in a new frame or packet (such as an MPDU or PPDU) designed for coordinated r-TWT signaling. As a result, the STA 1003 may schedule its communications to avoid interfering with latency-sensitive traffic in BSS2 (during r-TWT SP2) based on the coordinated r-TWT signaling information.

The AP 1002 schedules r-TWT SP2 based on its received coordinated r-TWT signaling information and transmits or broadcasts r-TWT schedule information indicating the schedule for r-TWT SP2. For example, the r-TWT schedule information may be carried in a broadcast r-TWT IE included in beacon frames or other management frames transmitted by the AP 1002 to the STA 1004 (such as in accordance with existing versions of the IEEE 802.11 standard). The STA 1004 joins r-TWT SP2 (as a member) responsive to receiving the r-TWT schedule information from the AP 1002. In some implementations, the r-TWT schedule information may assign the STA 1004 to r-TWT SP2. In some other implementations, the STA 1004 may request to join r-TWT SP2 based on the received r-TWT schedule information. Thereafter, the AP 1002 and the STA 1004 may exchange latency-sensitive traffic during r-TWT SP2.

In some aspects, the AP 1002 also may transmit coordinated r-TWT signaling information indicating the schedule for r-TWT SP1. In some implementations, the coordinated r-TWT signaling information may be carried in the broadcast r-TWT IE included in the beacon frames or other management frames transmitted by the AP 1002 to the STA 1004. In some other implementations, the coordinated r-TWT signaling information may be carried in a new coordinated r-TWT IE in the beacon frames or other management frames transmitted by the AP 1002 to the STA 1004. Still further, in some implementations, the coordinated r-TWT signaling information may be carried a new frame or packet (such as an MPDU or PPDU) designed for coordinated r-TWT signaling. As a result, the STA 1004 may schedule its communications to avoid interfering with latency-sensitive traffic in BSS1 (during r-TWT SP1) based on the coordinated r-TWT signaling information.

Figure 10B:
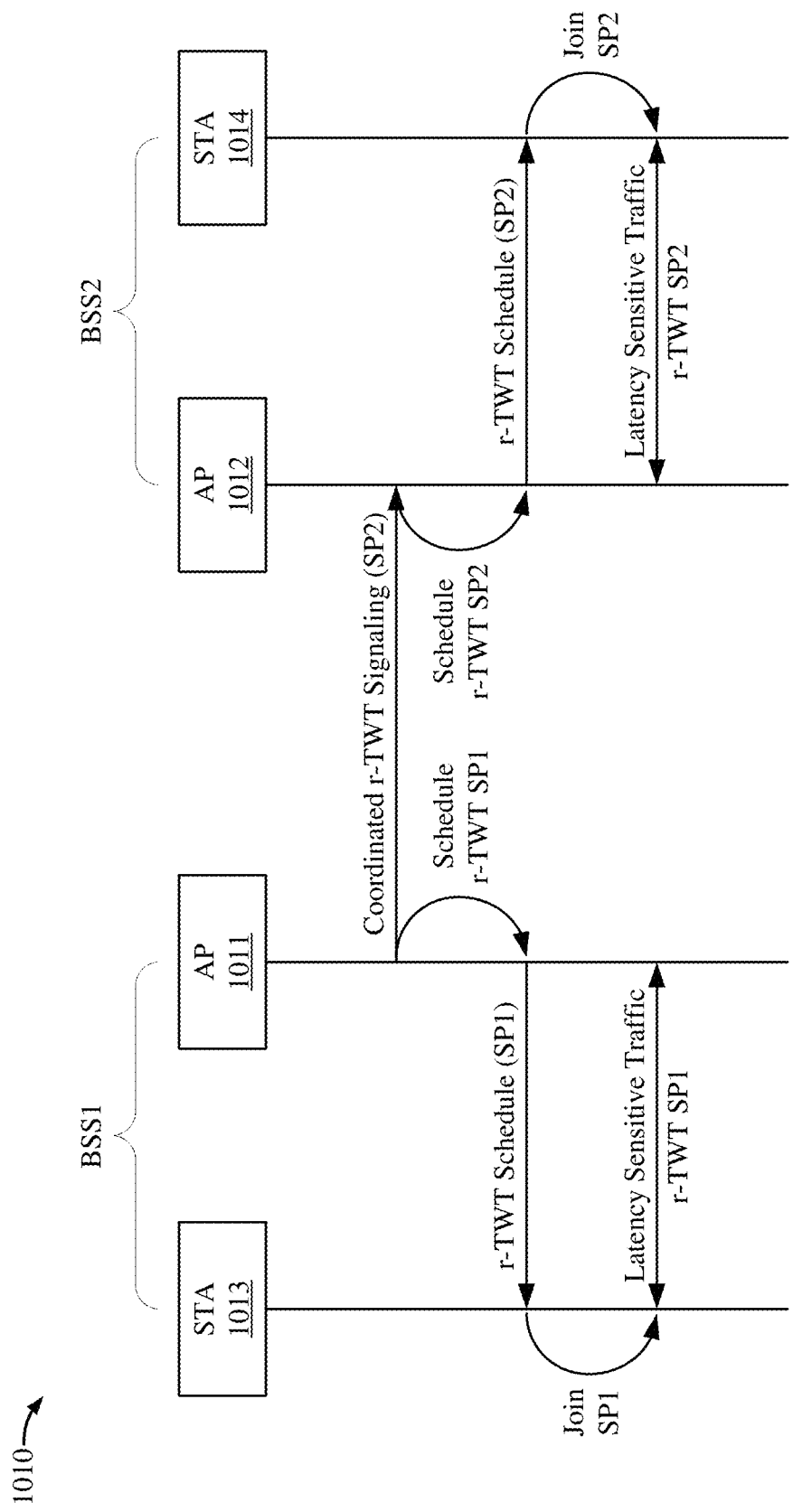
FIG. 10B shows a sequence diagram depicting an example message exchange between OBSSs that support coordinated scheduling of r-TWT SPs, according to some implementations.

FIG. 10B shows a sequence diagram 1010 depicting an example message exchange between OBSSs (BSS1 and BSS2) that support coordinated scheduling of r-TWT SPs, according to some implementations. As shown in FIG. 10B, BSS1 includes an AP 1011 and a STA 1013, and BSS2 includes an AP 1012 and a STA 1014. In some implementations, each of the APs 1011 and 1012 may be one example of the APs 711 and 712, respectively, of FIG. 7, the STA 1013 may be one example of any of the STAs 701 or 702, and the STA 1014 may be one example of any of the STAs 703-705.

In some aspects, the AP 1011 may coordinate the scheduling of r-TWT SPs for BSS1 and BSS2 so that latency-sensitive communications in BSS1 do not interfere or collide with latency-sensitive communications in BSS2. In the example of FIG. 10B, the AP 1011 may schedule a first r-TWT SP (r-TWT SP1) for BSS1 and a second r-TWT SP (r-TWT SP2) for BSS2. In some implementations, r-TWT SP1 and r-TWT SP2 may be orthogonal in time (such as described with reference to FIG. 8). In some other implementations, r-TWT SP1 and r-TWT SP2 may overlap in time (such as described with reference to FIG. 9). In such implementations, the AP 1011 may coordinate the allocation of resources (such as transmit power, timing, or frequency allocations) for wireless communications during the overlapping service periods r-TWT SP1 and r-TWT SP2.

The AP 1011 communicates coordinated r-TWT signaling information to the AP 1012. In some implementations, the AP 1011 may communicate the coordinated r-TWT signaling information to the AP 1012 via a (wired or wireless) backhaul. In some other implementations, the AP 1011 may transmit the coordinated r-TWT signaling information to the AP 1012 via one or more wireless communication packets or frames (such as a new action frame or an enhanced broadcast services (EBCS) frame). More specifically, the coordinated r-TWT signaling information may include a schedule for r-TWT SP2. In some implementations, the coordinated r-TWT signaling information also may include a schedule for r-TWT SP1.

The AP 1011 further transmits or broadcasts r-TWT schedule information indicating the schedule for r-TWT SP1. For example, the r-TWT schedule information may be carried in a broadcast r-TWT IE included in beacon frames or other management frames transmitted by the AP 1011 to the STA 1013 (such as in accordance with existing versions of the IEEE 802.11 standard). The STA 1013 joins r-TWT SP1 (as a member) responsive to receiving the r-TWT schedule information from the AP 1011. In some implementations, the r-TWT schedule information may assign the STA 1013 to r-TWT SP1. In some other implementations, the STA 1013 may request to join r-TWT SP1 based on the received r-TWT schedule information. Thereafter, the AP 1011 and the STA 1013 may exchange latency-sensitive traffic during r-TWT SP1.

In some aspects, the AP 1011 also may transmit coordinated r-TWT signaling information indicating the schedule for r-TWT SP2. In some implementations, the coordinated r-TWT signaling information may be carried in the broadcast r-TWT IE included in the beacon frames or other management frames transmitted by the AP 1011 to the STA 1013. In some other implementations, the coordinated r-TWT signaling information may be carried in a new coordinated r-TWT IE in the beacon frames or other management frames transmitted by the AP 1011 to the STA 1013. Still further, in some implementations, the coordinated r-TWT signaling information may be carried a new frame or packet (such as an MPDU or PPDU) designed for coordinated r-TWT signaling. As a result, the STA 1013 may schedule its communications to avoid interfering with latency-sensitive traffic in BSS2 (during r-TWT SP2) based on the coordinated r-TWT signaling information.

The AP 1012 schedules r-TWT SP2 based on its received coordinated r-TWT signaling information and transmits or broadcasts r-TWT schedule information indicating the schedule for r-TWT SP2. For example, the r-TWT schedule information may be carried in a broadcast r-TWT IE included in beacon frames or other management frames transmitted by the AP 1012 to the STA 1014 (such as in accordance with existing versions of the IEEE 802.11 standard). The STA 1014 joins r-TWT SP2 (as a member) responsive to receiving the r-TWT schedule information from the AP 1012. In some implementations, the r-TWT schedule information may assign the STA 1014 to r-TWT SP2. In some other implementations, the STA 1014 may request to join r-TWT SP2 based on the received r-TWT schedule information. Thereafter, the AP 1012 and the STA 1014 may exchange latency-sensitive traffic during r-TWT SP2.

In some aspects, the AP 1012 also may transmit coordinated r-TWT signaling information indicating the schedule for r-TWT SP1. In some implementations, the coordinated r-TWT signaling information may be carried in the broadcast r-TWT IE included in the beacon frames or other management frames transmitted by the AP 1012 to the STA 1014. In some other implementations, the coordinated r-TWT signaling information may be carried in a new coordinated r-TWT IE in the beacon frames or other management frames transmitted by the AP 1012 to the STA 1014. Still further, in some implementations, the coordinated r-TWT signaling information may be carried a new frame or packet (such as an MPDU or PPDU) designed for coordinated r-TWT signaling. As a result, the STA 1014 may schedule its communications to avoid interfering with latency-sensitive traffic in BSS1 (during r-TWT SP1) based on the coordinated r-TWT signaling information.

Figure 11A:
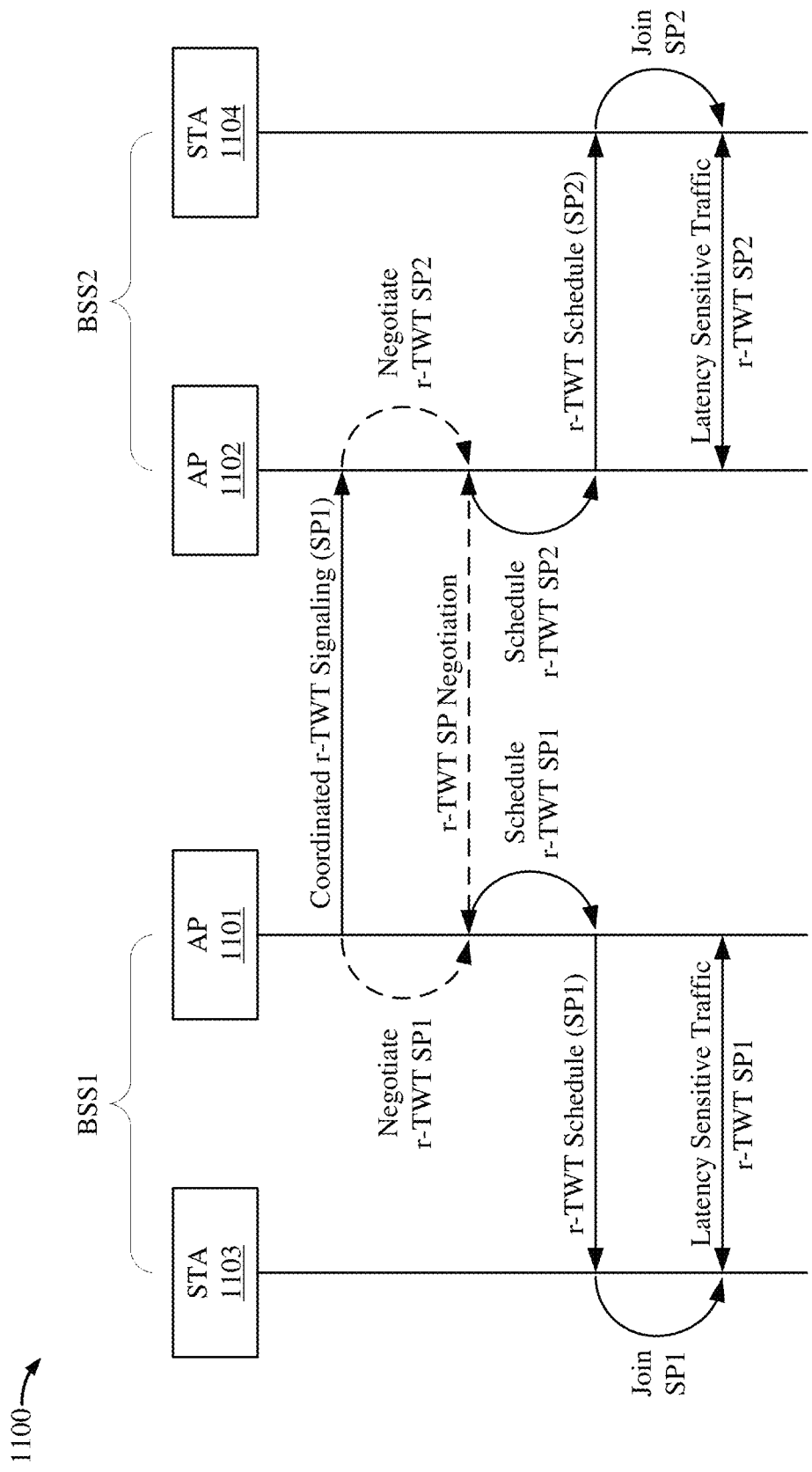
FIG. 11A shows a sequence diagram depicting an example message exchange between OBSSs that support coordinated scheduling of r-TWT SPs, according to some implementations.

FIG. 11A shows a sequence diagram 1100 depicting an example message exchange between OBSSs (BSS1 and BSS2) that support coordinated scheduling of r-TWT SPs, according to some implementations. As shown in FIG. 11A, BSS1 includes an AP 1101 and a STA 1103, and BSS2 includes an AP 1102 and a STA 1104. In some implementations, each of the APs 1101 and 1102 may be one example of the APs 711 and 712, respectively, of FIG. 7, the STA 1103 may be one example of any of the STAs 701 or 702, and the STA 1104 may be one example of any of the STAs 703-705.

In some aspects, the APs 1101 and 1102 may coordinate the scheduling of r-TWT SPs for BSS1 and BSS2 in a distributed manner so that latency-sensitive communications in BSS1 do not interfere or collide with latency-sensitive communications in BSS2. In the example of FIG. 11A, the AP 1101 schedules a first r-TWT SP (r-TWT SP1) for BSS1 and communicates coordinated r-TWT signaling information to the AP 1102 indicating the schedule for r-TWT SP1. In some implementations, the AP 1101 may communicate the coordinated r-TWT signaling information to the AP 1102 via a (wired or wireless) backhaul. In some other implementations, the AP 1101 may transmit the coordinated r-TWT signaling information to the AP 1102 via one or more wireless communication packets or frames (such as a new action frame or an enhanced broadcast services (EBCS) frame).

The AP 1102 schedules a second r-TWT SP (r-TWT SP2) for BSS2 based on the received coordinated r-TWT signaling information. More specifically, the AP 1102 may coordinate its schedule for r-TWT SP2 based on the schedule for r-TWT SP1. In some implementations, the AP 1102 may schedule r-TWT SP2 to be orthogonal in time to r-TWT SP1 (such as described with reference to FIG. 8). In some other implementations, the AP 1102 may schedule r-TWT SP2 to overlap in time with r-TWT SP1 (such as described with reference to FIG. 9). In such implementations, the access points AP 1101 and 1102 may further coordinate the allocation of resources (such as transmit power, timing, or frequency allocations) for wireless communications during the overlapping service periods r-TWT SP1 and r-TWT SP2.

In some implementations, the AP 1102 may negotiate with the AP 1101 to schedule r-TWT SP2 based on the coordinated r-TWT signaling information received from the AP 1101. For example, the AP 1102 may determine that the intended schedule for r-TWT SP1 does not permit suitable a suitable schedule to be allocated for r-TWT SP2. As such, the AP 1102 may reject one or more aspects of the intended schedule for r-TWT SP1 (such as an intended transmit power or allocation of resources). Similarly, the AP 1101 may negotiate with the AP 1102 to schedule r-TWT SP1. As a result of the negotiation process, the APs 1101 and 1102 may coordinate their schedules for r-TWT SP1 and r-TWT SP2, respectively, in a manner that is suitable for latency-sensitive traffic in BSS1 and BSS2.

The AP 1101 further transmits or broadcasts r-TWT schedule information indicating the schedule for r-TWT SP1. For example, the r-TWT schedule information may be carried in a broadcast r-TWT IE included in beacon frames or other management frames transmitted by the AP 1101 to the STA 1103 (such as in accordance with existing versions of the IEEE 802.11 standard). The STA 1103 joins r-TWT SP1 (as a member) responsive to receiving the r-TWT schedule information from the AP 1101. In some implementations, the r-TWT schedule information may assign the STA 1103 to r-TWT SP1. In some other implementations, the STA 1103 may request to join r-TWT SP1 based on the received r-TWT schedule information. Thereafter, the AP 1101 and the STA 1103 may exchange latency-sensitive traffic during r-TWT SP1.

In some aspects, the AP 1101 also may transmit coordinated r-TWT signaling information indicating the schedule for r-TWT SP2. In some implementations, the coordinated r-TWT signaling information may be carried in the broadcast r-TWT IE included in the beacon frames or other management frames transmitted by the AP 1101 to the STA 1103. In some other implementations, the coordinated r-TWT signaling information may be carried in a new coordinated r-TWT IE in the beacon frames or other management frames transmitted by the AP 1101 to the STA 1103. Still further, in some implementations, the coordinated r-TWT signaling information may be carried a new frame or packet (such as an MPDU or PPDU) designed for coordinated r-TWT signaling. As a result, the STA 1103 may schedule its communications to avoid interfering with latency-sensitive traffic in BSS2 (during r-TWT SP2) based on the coordinated r-TWT signaling information.

The AP 1102 further transmits or broadcasts r-TWT schedule information indicating the schedule for r-TWT SP2. For example, the r-TWT schedule information may be carried in a broadcast r-TWT IE included in beacon frames or other management frames transmitted by the AP 1102 to the STA 1104 (such as in accordance with existing versions of the IEEE 802.11 standard). The STA 1104 joins r-TWT SP2 (as a member) responsive to receiving the r-TWT schedule information from the AP 1102. In some implementations, the r-TWT schedule information may assign the STA 1104 to r-TWT SP2. In some other implementations, the STA 1104 may request to join r-TWT SP2 based on the received r-TWT schedule information. Thereafter, the AP 1102 and the STA 1104 may exchange latency-sensitive traffic during r-TWT SP2.

In some aspects, the AP 1102 also may transmit coordinated r-TWT signaling information indicating the schedule for r-TWT SP1. In some implementations, the coordinated r-TWT signaling information may be carried in the broadcast r-TWT IE included in the beacon frames or other management frames transmitted by the AP 1102 to the STA 1104. In some other implementations, the coordinated r-TWT signaling information may be carried in a new coordinated r-TWT IE in the beacon frames or other management frames transmitted by the AP 1102 to the STA 1104. Still further, in some implementations, the coordinated r-TWT signaling information may be carried a new frame or packet (such as an MPDU or PPDU) designed for coordinated r-TWT signaling. As a result, the STA 1104 may schedule its communications to avoid interfering with latency-sensitive traffic in BSS1 (during r-TWT SP1) based on the coordinated r-TWT signaling information.

Figure 11B:
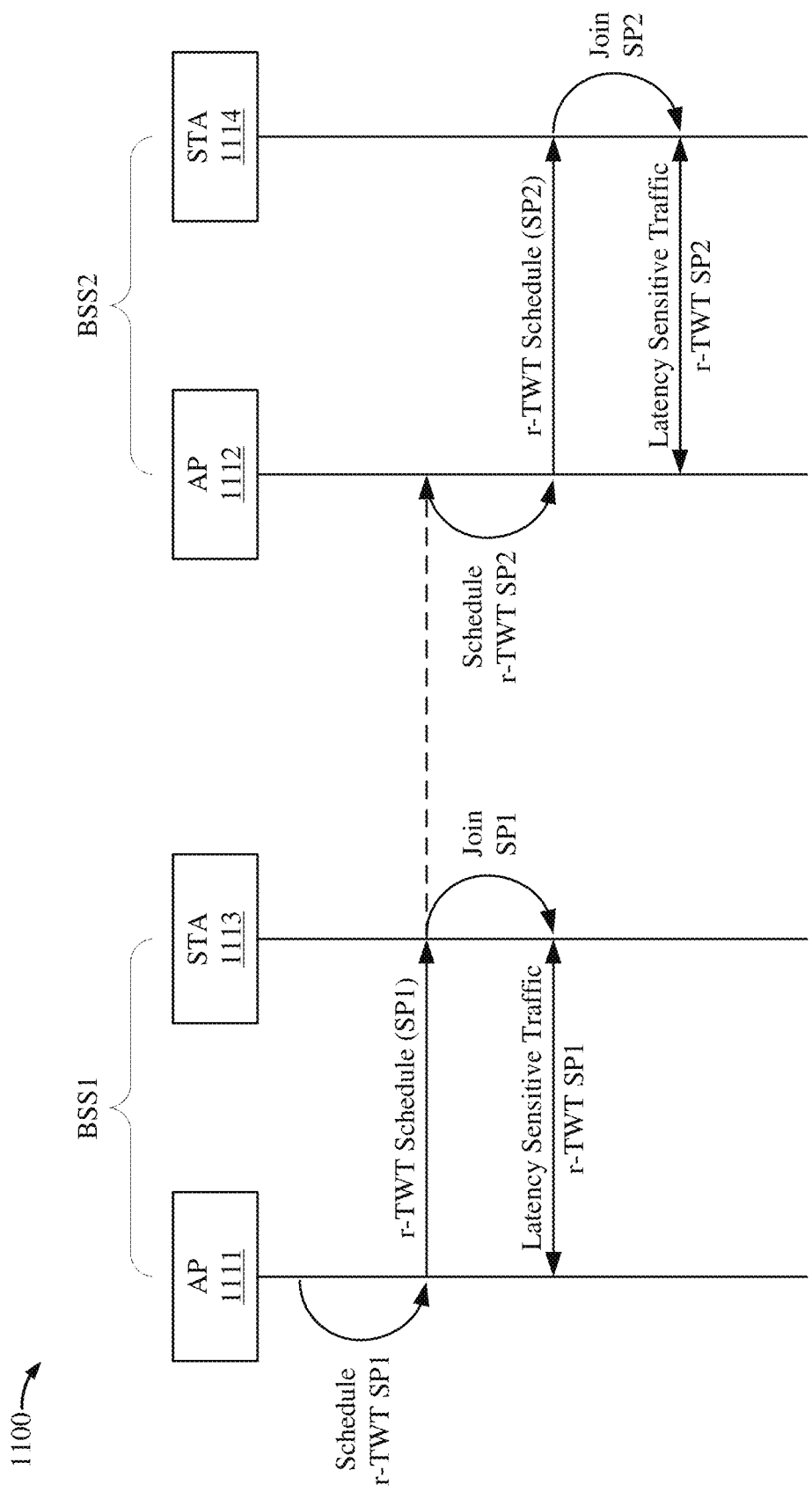
FIG. 11B shows a sequence diagram depicting an example message exchange between OBSSs that support coordinated scheduling of r-TWT SPs, according to some implementations.

FIG. 11B shows a sequence diagram 1110 depicting an example message exchange between OBSSs (BSS1 and BSS2) that support coordinated scheduling of r-TWT SPs, according to some implementations. As shown in FIG. 11B, BSS1 includes an AP 1111 and a STA 1113, and BSS2 includes an AP 1112 and a STA 1114. In some implementations, each of the APs 1111 and 1112 may be one example of the APs 711 and 712, respectively, of FIG. 7, the STA

1113 may be one example of any of the STAs 701 or 702, and the STA 1114 may be one example of any of the STAs 703-705.

In some aspects, the APs 1111 and 1112 may coordinate the scheduling of r-TWT SPs for BSS1 and BSS2 in a distributed manner so that latency-sensitive communications in BSS1 do not interfere or collide with latency-sensitive communications in BSS2. In the example of FIG. 11B, the AP 1111 schedules a first r-TWT SP (r-TWT SP1) for BSS1 and transmits or broadcasts r-TWT schedule information indicating the schedule for r-TWT SP1. For example, the r-TWT schedule information may be carried in a broadcast r-TWT IE included in beacon frames or other management frames transmitted by the AP 1111 to the STA 1113 (such as in accordance with existing versions of the IEEE 802.11 standard). The STA 1113 joins r-TWT SP1 (as a member) responsive to receiving the r-TWT schedule information from the AP 1111. In some implementations, the r-TWT schedule information may assign the STA 1113 to r-TWT SP1. In some other implementations, the STA 1113 may request to join r-TWT SP1 based on the received r-TWT schedule information. Thereafter, the AP 1111 and the STA 1113 may exchange latency-sensitive traffic during r-TWT SP1.

The AP 1112 acquires the r-TWT schedule information from the AP 1111 and schedules a second r-TWT SP (r-TWT SP2) for BSS2 based on the acquired r-TWT schedule information. For example, the AP 1112 may acquire the r-TWT schedule information by intercepting one or more frames transmitted by the AP 1111 to the STA 1113 (or other STAs within BSS1). As a result, the AP 1112 may coordinate its schedule for r-TWT SP2 based on the schedule for r-TWT SP1. In some implementations, the AP 1112 may schedule r-TWT SP2 to be orthogonal in time to r-TWT SP1 (such as described with reference to FIG. 8). In some other implementations, the AP 1112 may schedule r-TWT SP2 to overlap in time with r-TWT SP1 (such as described with reference to FIG. 9). In such implementations, the access points AP 1111 and 1112 may further coordinate the allocation of resources (such as transmit power, timing, or frequency allocations) for wireless communications during the overlapping service periods r-TWT SP1 and r-TWT SP2.

The AP 1112 further transmits or broadcasts r-TWT schedule information indicating the schedule for r-TWT SP2. For example, the r-TWT schedule information may be carried in a broadcast r-TWT IE included in beacon frames or other management frames transmitted by the AP 1112 to the STA 1114 (such as in accordance with existing versions of the IEEE 802.11 standard). The STA 1114 joins r-TWT SP2 (as a member) responsive to receiving the r-TWT schedule information from the AP 1112. In some implementations, the r-TWT schedule information may assign the STA 1114 to r-TWT SP2. In some other implementations, the STA 1114 may request to join r-TWT SP2 based on the received r-TWT schedule information. Thereafter, the AP 1112 and the STA 1114 may exchange latency-sensitive traffic during r-TWT SP2.

In some aspects, the AP 1112 also may transmit coordinated r-TWT signaling information indicating the schedule for r-TWT SP1. In some implementations, the coordinated r-TWT signaling information may be carried in the broadcast r-TWT IE included in the beacon frames or other management frames transmitted by the AP 1112 to the STA 1114. In some other implementations, the coordinated r-TWT signaling information may be carried in a new coordinated r-TWT IE in the beacon frames or other management frames transmitted by the AP 1112 to the STA 1114. Still further, in some implementations, the coordinated r-TWT signaling information may be carried a new frame or packet (such as an MPDU or PPDU) designed for coordinated r-TWT signaling. As a result, the STA 1114 may schedule its communications to avoid interfering with latency-sensitive traffic in BSS1 (during r-TWT SP1) based on the coordinated r-TWT signaling information.

In some aspects, the AP 1111 also may transmit coordinated r-TWT signaling information indicating the schedule for r-TWT SP2. For example, the AP 1111 may acquire the schedule for r-TWT SP2 by intercepting one or more frames transmitted by the AP 1112 to the STA 1114 (or other STAs within BSS2). In some implementations, the coordinated r-TWT signaling information may be carried in the broadcast r-TWT IE included in the beacon frames or other management frames transmitted by the AP 1111 to the STA 1113. In some other implementations, the coordinated r-TWT signaling information may be carried in a new coordinated r-TWT IE in the beacon frames or other management frames transmitted by the AP 1111 to the STA 1113. Still further, in some implementations, the coordinated r-TWT signaling information may be carried a new frame or packet (such as an MPDU or PPDU) designed for coordinated r-TWT signaling. As a result, the STA 1113 may schedule its communications to avoid interfering with latency-sensitive traffic in BSS2 (during r-TWT SP2) based on the coordinated r-TWT signaling information.

Figure 12:
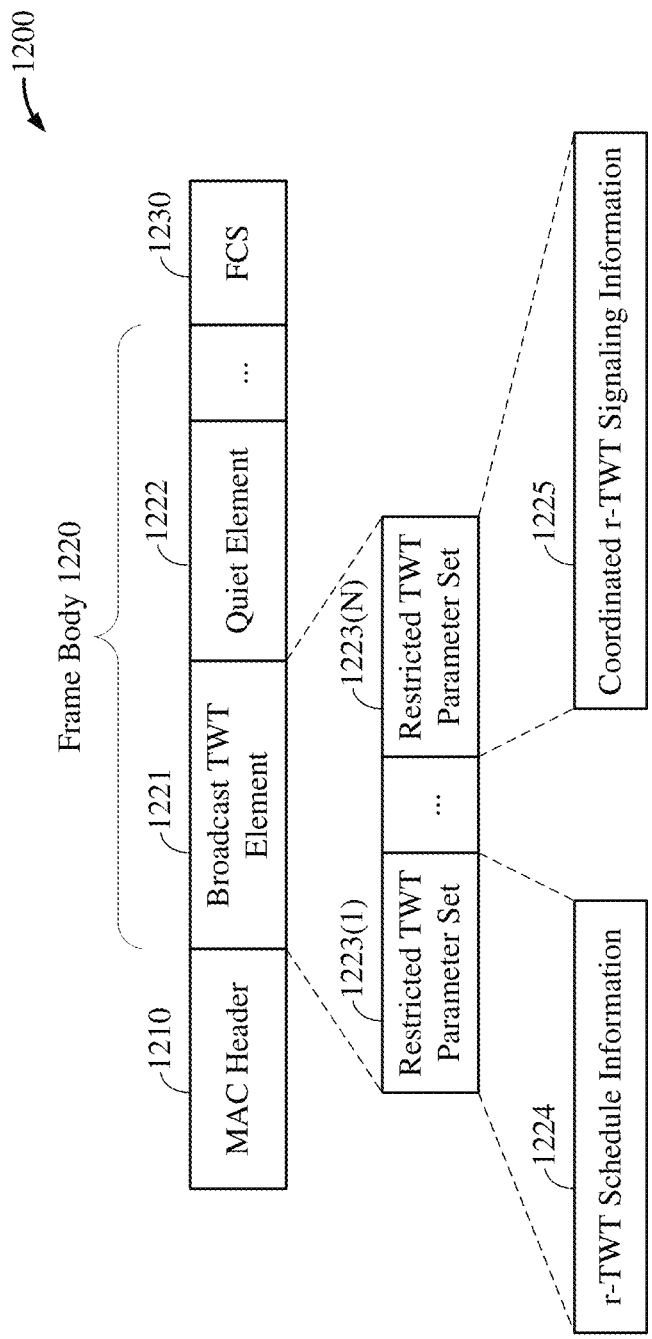
FIG. 12 shows an example packet usable for coordinated r-TWT signaling between one or more APs and one or more STAs, according to some implementations.

FIG. 12 shows an example packet 1200 usable for coordinated r-TWT signaling between one or more APs and one or more STAs, according to some implementations. In the example of FIG. 12, the packet 1200 is depicted as a MPDU frame. With reference for example to FIG. 3, the packet 1200 may be one example of the MPDU frame 310. In some implementations, the packet 1200 may be a management frame type defined by existing versions of the IEEE 802.11 standard (such as a beacon or probe response frame). In some other implementations, the packet 1200 may be a new type of frame (such as an action frame or EBCS frame) designed for coordinated r-TWT signaling.

In some aspects the packet 1200 may be transmitted by an AP to one or more STAs associated with its BSS. In some implementations, the packet 1200 may be used to assign the associated STAs to one or more r-TWT SPs allocated for latency-sensitive communications within the current BSS. In some other implementations, the packet 1200 may be used to prevent the associated STAs from interfering with latency-sensitive communications in one or more OBSSs. In some other aspects, the packet 1200 may be transmitted by an AP to other APs associated with one or more OBSS. In some implementations, the packet 1200 may be used to coordinate r-TWT SP schedules with the other APs. In some other implementations, the packet 1200 may be used to prevent the other APs from interfering with latency-sensitive communications in the current BSS.

The packet 1200 includes a MAC header 1210 followed by a frame body 1220 and an FCS 1230. Although not shown, for simplicity, the MAC header 1210 may include a frame control field, a duration field, a receiver address (RA) field, and a transmitter address (TA) field. The frame body 1220 includes one or more IEs carrying information related to r-TWT operation. In some implementations, the frame body 1220 may include a broadcast TWT element 1221 and a quiet element 1222. The broadcast TWT element 1221 includes a number (N) of restricted TWT parameter sets 1231(1)-1231(N) each carrying information associated with a respective r-TWT SP. In some implementations, at least one of the restricted TWT parameter sets 1231(1)-1231(N)

is used to carry r-TWT schedule information 1224 and at least one of the restricted TWT parameter sets 1231(1)-1231(N) is used carry coordinated r-TWT signaling information 1225.

In some implementations, the r-TWT schedule information 1224 may be one example of any of the r-TWT schedule information described with reference to FIGS. 7-11B. More specifically, the r-TWT schedule information 1224 may indicate an r-TWT SP schedule for the current BSS. In some implementations, the coordinated r-TWT signaling information 1225 may be one example of any of the coordinated r-TWT signaling information described with reference to FIG. 7-11B. More specifically, the coordinated r-TWT signaling information 1225 may indicate an r-TWT SP schedule for an OBSS. The quiet element 1222 may carry information indicating one or more quiet durations (such as defined by existing versions of the IEEE 802.11 standard). In some implementations, the one or more quiet durations may span the durations of one or more r-TWT SPs allocated for the current BSS. In some other implementations, the one or more quiet durations may span the durations of one or more r-TWT SPs allocated for an OBSS.

In some implementations, the broadcast TWT element 1221 may conform to an existing broadcast TWT element format, such as defined by the IEEE 802.11be amendment of the IEEE 802.11 standard. In such implementations, the coordinated r-TWT signaling information 1225 may be implemented with only minor changes to the IEEE 802.11 standard. However, aspects of the present disclosure recognize that each restricted TWT parameter set may include information that is unrelated or unnecessary to coordinated r-TWT signaling (such as information used to set up or establish an r-TWT SP with one or more low-latency STAs). Thus, in some implementations, the coordinated r-TWT signaling information 1225 may represent only a subset of the information carried in a restricted TWT parameter set.

Figure 13:
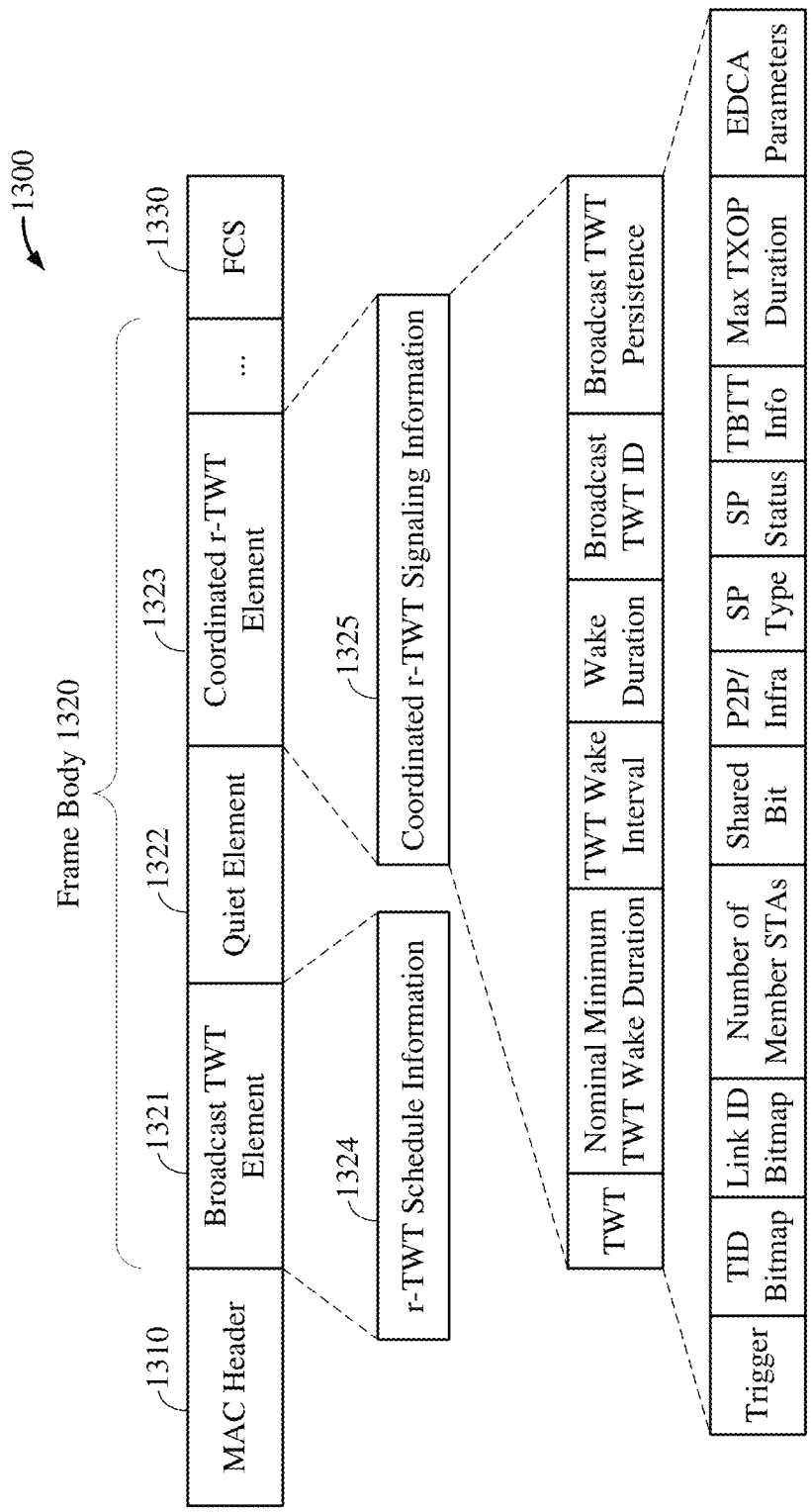
FIG. 13 shows another example packet usable for coordinated r-TWT signaling between one or more APs and one or more STAs, according to some implementations.

FIG. 13 shows another example packet 1300 usable for coordinated r-TWT signaling between one or more APs and one or more STAs, according to some implementations. In the example of FIG. 13, the packet 1300 is depicted as a MPDU frame. With reference for example to FIG. 3, the packet 1300 may be one example of the MPDU frame 310. In some implementations, the packet 1300 may be a management frame type defined by existing versions of the IEEE 802.11 standard (such as a beacon or probe response frame). In some other implementations, the packet 1300 may be a new type of frame (such as an action frame or EBCS frame) designed for coordinated r-TWT signaling.

In some aspects the packet 1300 may be transmitted by an AP to one or more STAs associated with its BSS. In some implementations, the packet 1300 may be used to assign the associated STAs to one or more r-TWT SPs allocated for latency-sensitive communications within the current BSS. In some other implementations, the packet 1300 may be used to prevent the associated STAs from interfering with latency-sensitive communications in one or more OBSSs. In some other aspects, the packet 1300 may be transmitted by an AP to other APs associated with one or more OBSS. In some implementations, the packet 1300 may be used to coordinate r-TWT SP schedules with the other APs. In some other implementations, the packet 1300 may be used to prevent the other APs from interfering with latency-sensitive communications in the current BSS.

The packet 1300 includes a MAC header 1310 followed by a frame body 1320 and an FCS 1330. Although not shown, for simplicity, the MAC header 1310 may include a frame control field, a duration field, an RA field, and a TA field. The frame body 1320 includes one or more IEs carrying information related to r-TWT operation. In some implementations, the frame body 1320 may include a broadcast TWT element 1321, a quiet element 1322, and a coordinated r-TWT element 1323. In the example of FIG. 13, the broadcast TWT element 1321 carries r-TWT schedule information 1324 and the coordinated r-TWT element 1323 carries coordinated r-TWT signaling information 1325.

In some implementations, the r-TWT schedule information 1324 may be one example of any of the r-TWT schedule information described with reference to FIGS. 7-11B. More specifically, the r-TWT schedule information 1324 may indicate an r-TWT SP schedule for the current BSS. In some implementations, the coordinated r-TWT signaling information 1325 may be one example of any of the coordinated r-TWT signaling information described with reference to FIG. 7-11B. More specifically, the coordinated r-TWT signaling information 1325 may indicate an r-TWT SP schedule for an OBSS. The quiet element 1322 may carry information indicating one or more quiet durations (such as defined by existing versions of the IEEE 802.11 standard). In some implementations, the one or more quiet durations may span the durations of one or more r-TWT SPs allocated for the current BSS. In some other implementations, the one or more quiet durations may span the durations of one or more r-TWT SPs allocated for an OBSS.

Although only one coordinated r-TWT element 1323 is shown in FIG. 13, for simplicity, the packet 1300 may include any number (N) of coordinated r-TWT elements to carrying coordinated r-TWT signaling information for N OBSSs, respectively, in some other implementations. In some implementations, the coordinated r-TWT signaling information 1325 may include only a set of parameters necessary for coordinated r-TWT signaling (or scheduling). With reference for example to FIG. 12, the coordinated r-TWT signaling information 1325 may include only a subset of the information carried in the restricted TWT parameter set 1223(N). In some implementations, the coordinated r-TWT signaling information 1325 may include one or more additional parameters not included in the restricted TWT parameter set 1223(N). For example, the additional parameters may represent information specific to coordinated r-TWT signaling.

As shown in FIG. 13, the coordinated r-TWT signaling information 1325 may include TWT information indicating a time (relative to a TBTT) at which low-latency STAs associated with an r-TWT SP must be awake; a nominal minimum TWT wake duration indicating a duration of the r-TWT SP (in wake duration units); a TWT wake interval indicating an average time between r-TWT SPs (which may be computed using a TWT wake interval mantissa and a TWT wake interval exponent); a wake duration unit (in µs or TUs); a broadcast TWT ID used to identify the r-TWT SP; and broadcast TWT persistence information indicating a duration (in TBTTs) for which the coordinated r-TWT signaling information 1325 is valid.

In some implementations, the coordinated r-TWT signaling information 1325 may further include trigger information indicating whether latency-sensitive communications within the r-TWT SP are trigger-based, not trigger-based, or a hybrid thereof; a TID bitmap indicating one or more traffic identifiers (TIDs) supported by the r-TWT SP; a link ID bitmap indicating one or more communication links that can be used for communicating latency-sensitive data traffic during the r-TWT SP; an indication of a number of member STAs assigned (or subscribed) to the r-TWT SP; a shared bit indicating whether the r-TWT SP can be shared by an overlapping r-TWT SP (such as a multi-AP coordination opportunity); an indication of whether the r-TWT SP is allocated for peer-to-peer (P2P) communications, infrastructure BSS (infra) communications, or a hybrid thereof; SP type information indicating whether the coordinated r-TWT signaling information 1325 is associated with the current BSS or an OBSS; SP status information indicating whether membership in the r-TWT SP is full; TBTT information that can be used to coordinate the timing or frequency of TBTTs between multiple APs; maximum TXOP duration information indicating the maximum duration that can be allocated for a TXOP during the r-TWT SP; and an indication of one or more EDCA parameters supported by the r-TWT SP.

In some aspects, the parameters associated with the coordinated r-TWT signaling information 1325 may vary depending on whether the intended recipient of the packet 1300 is a STA (associated with the current BSS) or an AP (associated with an OBSS). For example, one or more parameters may be omitted from the coordinated r-TWT signaling information 1325 provided to STAs in the current BSS (such as the shared bit or TBTT information) to reduce the signaling overhead of the packet 1300. Similarly, one or more parameters may be omitted from the coordinated r-TWT signaling information 1325 provided to APs in one or more OBSSs (such as the TID bitmap or the SP status information).

Figure 14:
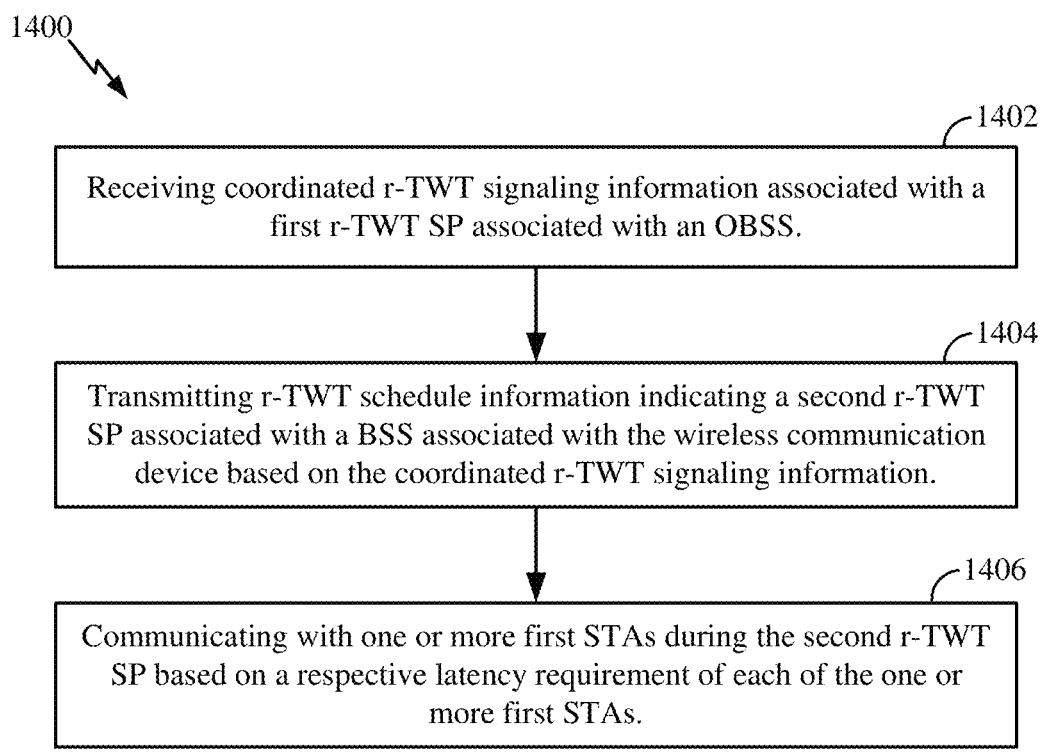
FIG. 14 shows a flowchart illustrating an example process for wireless communication that supports coordinated scheduling and signaling of r-TWT SPs.

FIG. 14 shows a flowchart illustrating an example process 1400 for wireless communication that supports coordinated scheduling and signaling of r-TWT SPs. In some implementations, the process 1400 may be performed by a wireless communication device operating as or within an AP, such as one of the APs 102 or 502 described above with reference to FIGS. 1 and 5A, respectively.

In some implementations, the process 1400 begins in block 1402 with receiving coordinated r-TWT signaling information associated with a first r-TWT SP associated with an OBSS. In block 1404, the process 1400 proceeds with transmitting r-TWT schedule information indicating a second r-TWT SP associated with a BSS associated with the wireless communication device based on the coordinated r-TWT signaling information. In block 1406, the process 1400 proceeds with communicating with one or more first STAs during the second r-TWT SP based on a respective latency requirement of each of the one or more first STAs.

In some aspects, the first r-TWT SP may be orthogonal to the second r-TWT SP in time. In some other aspects, the first r-TWT may overlap the second r-TWT SP in time. In some implementations, the wireless communication device may communicate with the one or more first STAs by transmitting an MU-RTS frame to the one or more first STAs. In some other implementations, the coordinated r-TWT signaling information may include shared SP information indicating a multi-AP coordination opportunity associated with the first r-TWT SP. In such implementations, the wireless communication device may coordinate with an AP associated with the OBSS based on the shared SP information so that the communications with the one or more first STAs occur concurrently with communications in the OBSS.

In some implementations, the wireless communication device may coordinate with the AP by exchanging transmit power information indicating at least one of a transmit power associated with the communications with the one or more first STAs or a transmit power associated with the communications in the OBSS. In some other implementations, the wireless communication device may coordinate with the AP by exchanging frequency resource information indicating at least one of an allocation of frequency resources for the communications with the one or more first STAs or an allocation of frequency resources for the communications in the OBSS.

In some aspects, the coordinated r-TWT signaling information may indicate an allocation of resources for the second r-TWT SP. In some other aspects, the coordinated r-TWT signaling information may indicate an allocation of resources for the first r-TWT SP. In some implementations, the wireless communication device may negotiate, with an AP associated with the OBSS, an allocation of resources for the second r-TWT SP based on the coordinated r-TWT signaling information. In some implementations, the coordinated r-TWT signaling information may be carried in one or more packets transmitted to the wireless communication device by an AP associated with the OBSS. In some other implementations, the coordinated r-TWT signaling information may be carried in one or more management frames transmitted, by an AP associated with the OBSS, to one or more STAs associated with the OBSS. In some implementations, the coordinated r-TWT signaling information may be received from a STA associated with the BSS that intercepts the one or more management frames transmitted by the AP associated with the OBSS.

In some aspects, the wireless communication device may further transmit r-TWT coordination information indicating the first r-TWT SP associated with the OBSS. In some implementations, the r-TWT schedule information and the r-TWT coordination information may be carried in a broadcast TWT IE included in one or more packets transmitted by the wireless communication device. In some other implementations, the r-TWT schedule information and the r-TWT coordination information may be carried in a broadcast TWT IE and a coordinated r-TWT IE, respectively, included in one or more packets transmitted by the wireless communication device, where the coordinated r-TWT IE is different than the broadcast TWT IE.

Figure 15A:
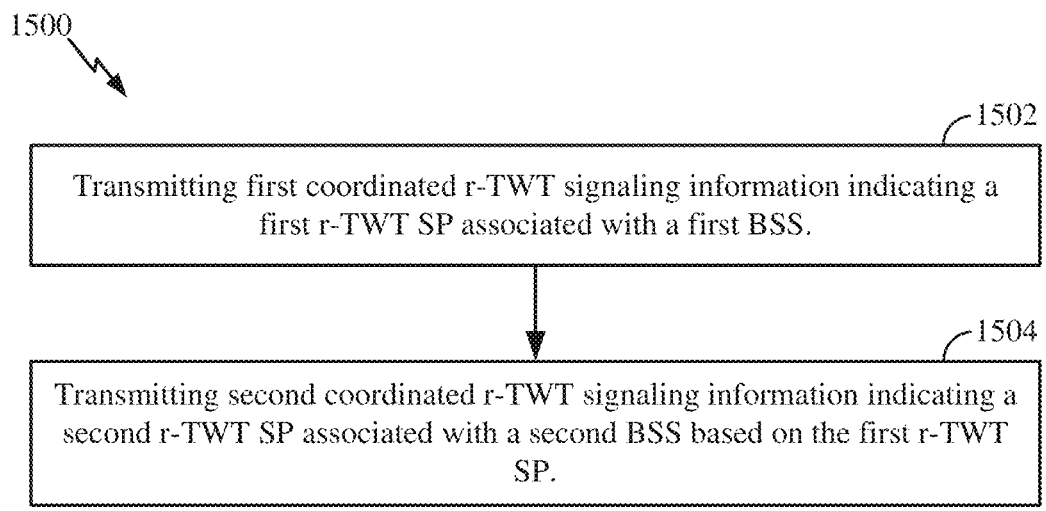
FIG. 15A shows a flowchart illustrating an example process for wireless communication that supports coordinated scheduling and signaling of r-TWT SPs.

FIG. 15A shows a flowchart illustrating an example process 1500 for wireless communication that supports coordinated scheduling and signaling of r-TWT SPs. In some implementations, the process 1500 may be performed by a wireless communication device operating as or within an AP, such as one of the APs 102 or 502 described above with reference to FIGS. 1 and 5A, respectively.

In some implementations, the process 1500 begins in block 1502 with transmitting first coordinated r-TWT signaling information indicating a first r-TWT SP associated with a first BSS. In block 1504, the process 1500 proceeds with transmitting second coordinated r-TWT signaling information indicating a second r-TWT SP associated with a second BSS based on the first r-TWT SP. In some aspects, the first r-TWT SP may be orthogonal to the second r-TWT SP in time.

In some other aspects, the first r-TWT SP may overlap the second r-TWT SP in time. In some implementations, the first coordinated r-TWT signaling information may indicate a transmit power associated with communications in the first BSS during the first r-TWT SP and the second coordinated r-TWT signaling information may indicate a transmit power associated with communications in the second BSS during the second r-TWT SP. In some other implementations, the first coordinated r-TWT signaling information may indicate an allocation of first frequency resources for communications in the first BSS during the first r-TWT SP and the second coordinated r-TWT signaling information may indicate an allocation of second frequency resources for communications in the second BSS during the second r-TWT SP.

In such implementations, the first frequency resources may be orthogonal to the second frequency resources.

In some implementations, the first coordinated r-TWT signaling information and the second coordinated r-TWT signaling information may be carried in a broadcast TWT IE included in one or more packets transmitted by the wireless communication device. In some other implementations, the first coordinated r-TWT signaling information and the second coordinated r-TWT signaling information may be carried in first and second coordinated r-TWT IEs, respectively, included in one or more packets transmitted by the wireless communication device.

Figure 15B:
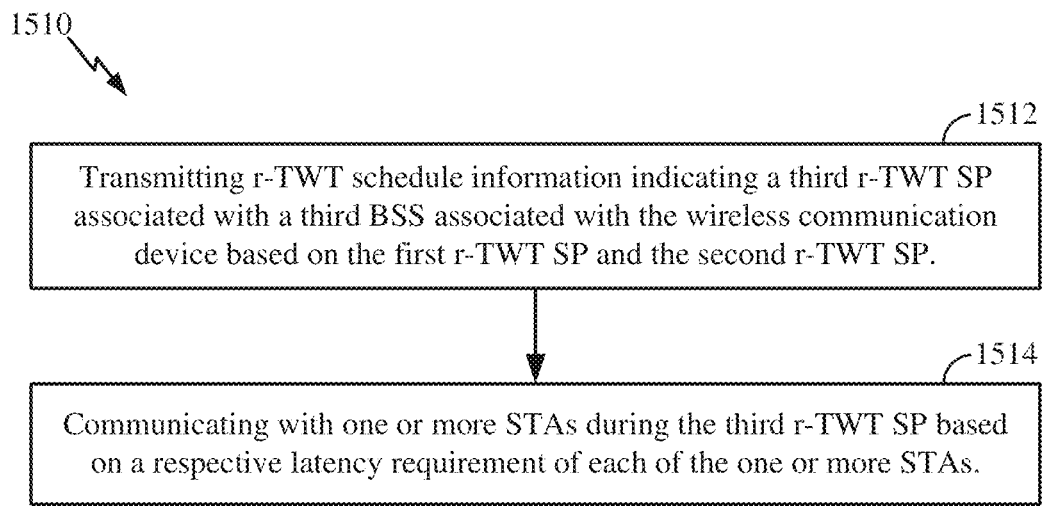
FIG. 15B shows a flowchart illustrating an example process for wireless communication that supports coordinated scheduling and signaling of r-TWT SPs.

FIG. 15B shows a flowchart illustrating an example process 1510 for wireless communication that supports coordinated scheduling and signaling of r-TWT SPs. In some implementations, the process 1510 may be performed by a wireless communication device operating as or within an AP, such as one of the APs 102 or 502 described above with reference to FIGS. 1 and 5A, respectively.

With reference for example to FIG. 15A, the process 1510 may begin, in block 1512, after the transmission of the first coordinated r-TWT signaling information in block 1502 and after the transmission of the second coordinated r-TWT signaling information in block 1504. In some implementations, the process 1510 begins in block 1512 by transmitting r-TWT schedule information indicating a third r-TWT SP associated with a third BSS associated with the wireless communication device based on the first r-TWT SP and the second r-TWT SP. In block 1514, the process 1510 proceeds with communicating with one or more STAs during the third r-TWT SP based on a respective latency requirement of each of the one or more STAs.

Figure 16:
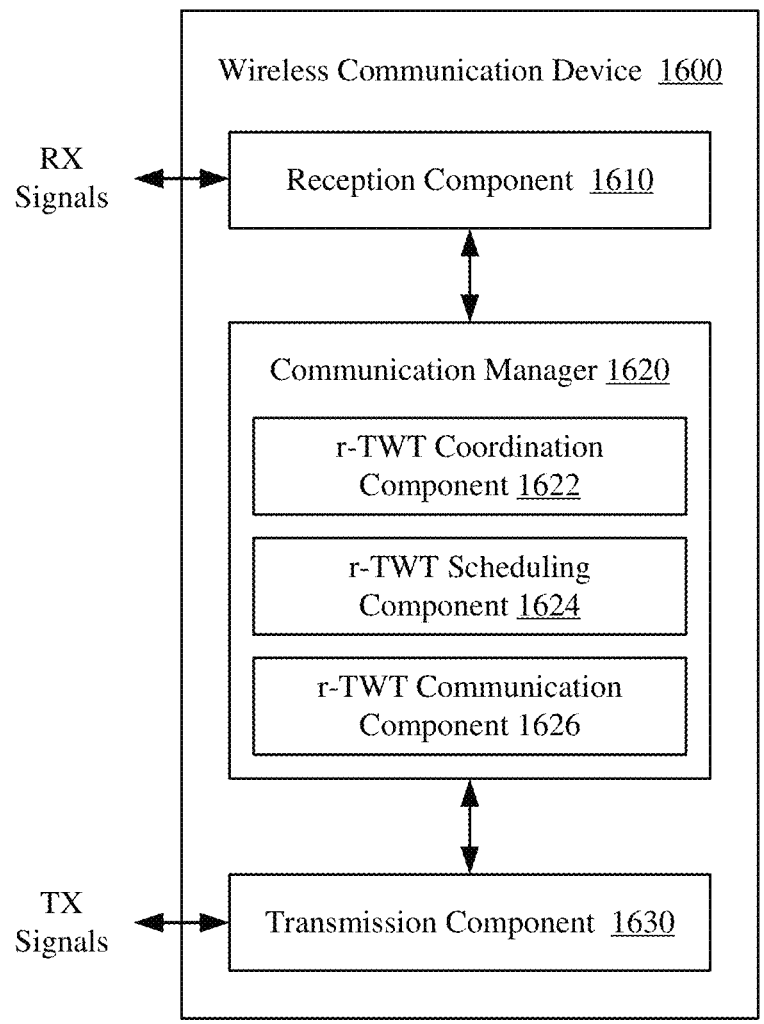
FIG. 16 shows a block diagram of an example wireless communication device according to some implementations.

FIG. 16 shows a block diagram of an example wireless communication device 1600 according to some implementations. In some implementations, the wireless communication device 1600 is configured to perform the process 1400 described above with reference to FIG. 14. The wireless communication device 1600 can be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes an r-TWT coordination component 1622, an r-TWT scheduling component 1624, and an r-TWT communication component 1626. Portions of one or more of the components 1622, 1624, and 1626 may be implemented at least in part in hardware or firmware. In some implementations, at least some of the components 1622, 1624, or 1626 are implemented at least in part as software stored in a memory (such as the memory 408). For example, portions of one or more of the components 1622, 1624, and 1626 can be implemented as non-transitory instructions (or "code") executable by a processor (such as the processor 406) to perform the functions or operations of the respective component.

The reception component 1610 is configured to receive RX signals, over a wireless channel, from one or more other wireless communication devices. The transmission component 1630 is configured to transmit TX signals, over a wireless channel, to one or more other wireless communication devices. The communication manager 1620 is configured to control or manage communications with one or more other wireless communication devices. In some implementations, the r-TWT coordination component 1622 may receive coordinated r-TWT signaling information associated with a first r-TWT SP associated with an OBSS; the r-TWT scheduling component 1624 may transmit r-TWT schedule information indicating a second r-TWT SP associated with a BSS associated with the wireless communication device based on the coordinated r-TWT signaling information; and the r-TWT communication component 1626 may communicate with one or more STAs during the second r-TWT SP based on a respective latency requirement of each of the one or more STAs.

Figure 17:
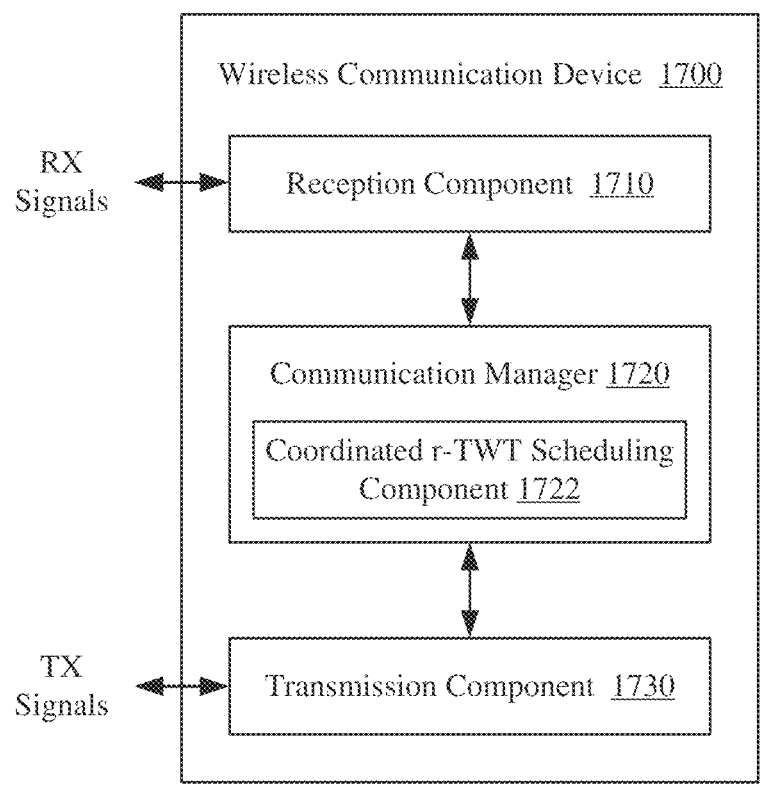
FIG. 17 shows a block diagram of an example wireless communication device according to some implementations.

FIG. 17 shows a block diagram of an example wireless communication device 1700 according to some implementations. In some implementations, the wireless communication device 1700 is configured to perform the process 1500 described above with reference to FIG. 15. The wireless communication device 1700 can be an example implementation of the wireless communication device 400 described above with reference to FIG. 4. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 further includes a coordinated r-TWT scheduling component 1722. Portions of the coordinated r-TWT scheduling component 1722 may be implemented at least in part in hardware or firmware. In some implementations, the coordinated r-TWT scheduling component 1722 is implemented at least in part as software stored in a memory (such as the memory 408). For example, portions of the coordinated r-TWT scheduling component 1722 can be implemented as non-transitory instructions (or "code") executable by a processor (such as the processor 406) to perform the functions or operations of the respective component.

The reception component 1710 is configured to receive RX signals, over a wireless channel, from one or more other wireless communication devices. The transmission component 1730 is configured to transmit TX signals, over a wireless channel, to one or more other wireless communication devices. The communication manager 1720 is configured to control or manage communications with one or more other wireless communication devices. In some implementations, the coordinated r-TWT scheduling component 1722 may transmit first coordinated r-TWT signaling information indicating a first r-TWT SP associated with a first BSS, and may further transmit second coordinated r-TWT signaling information indicating a second r-TWT SP associated with a second BSS based on the first r-TWT SP.

Implementation examples are described in the following numbered clauses:
1. A method for wireless communication by a wireless communication device, including:
   receiving coordinated restricted target wake time (r-TWT) signaling information associated with a first r-TWT service period (SP) associated with an overlapping basic service set (OBSS);
   transmitting r-TWT schedule information indicating a second r-TWT SP associated with a basic service set (BSS) associated with the wireless communication device based on the coordinated r-TWT signaling information; and communicating with one or more first wireless stations (STAs) during the second r-TWT SP based on a respective latency requirement of each of the one or more first STAs.
2. The method of clause 1, where the first r-TWT SP is orthogonal to the second r-TWT SP in time.
3. The method of clause 1, where the first r-TWT overlaps the second r-TWT SP in time.
4. The method of any of clauses 1 or 3, where the communicating with the one or more first STAs includes:
transmitting a multi-user request-to-send (MU-RTS) frame to the one or more first STAs.
5. The method of any of clauses 1 or 3, where the coordinated r-TWT signaling information includes shared SP information indicating a multiple access point (multi-AP) coordination opportunity associated with the first r-TWT SP.
6. The method of any of clauses 1, 3, or 5, where the communicating with the one or more first STAs includes:
coordinating with an access point (AP) associated with the OBSS based on the shared SP information so that the communications with the one or more first STAs occur concurrently with communications in the OBSS.
7. The method of any of clauses 1, 3, 5, or 6, where the coordinating with the AP includes:
exchanging, with the AP, transmit power information indicating at least one of a transmit power associated with the communications with the one or more first STAs or a transmit power associated with the communications in the OBSS.
8. The method of any of clauses 1, 3, 5, or 6, where the coordinating with the AP includes:
exchanging, with the AP, frequency resource information indicating at least one of an allocation of frequency resources for the communications with the one or more first STAs or an allocation of frequency resources for the communications in the OBSS.
9. The method of any of clauses 1-8, where the coordinated r-TWT signaling information indicates an allocation of resources for the second r-TWT SP.
10. The method of any of clauses 1-8, where the coordinated r-TWT signaling information indicates an allocation of resources for the first r-TWT SP.
11. The method of any of clauses 1-8 or 10, further including:
negotiating, with an AP associated with the OBSS, an allocation of resources for the second r-TWT SP based on the coordinated r-TWT signaling information.
12. The method of any of clauses 1-8 or 10, where the coordinated r-TWT signaling information is carried in one or more packets transmitted to the wireless communication device by an AP associated with the OBSS.
13. The method of any of clauses 1-8 or 10, where the coordinated r-TWT signaling information is carried in one or more management frames transmitted, by an AP associated with the OBSS, to one or more STAs associated with the OBSS.
14. The method of any of clauses 1-8 or 10, where the coordinated r-TWT signaling information is received from a STA associated with the BSS that intercepts the one or more management frames transmitted by the AP associated with the OBSS.
15. The method of any of clauses 1-14, further including:
transmitting r-TWT coordination information indicating the first r-TWT SP associated with the OBSS.
16. The method of any of clauses 1-15, where the r-TWT schedule information and the r-TWT coordination information are carried in a broadcast target wake time (TWT) information element (IE) included in one or more packets transmitted by the wireless communication device.
17. The method of any of clauses 1-15, where the r-TWT schedule information and the r-TWT coordination information are carried in a broadcast TWT IE and a coordinated r-TWT IE, respectively, included in one or more packets transmitted by the wireless communication device, the coordinated r-TWT IE being different than the broadcast TWT IE.
18. A wireless communication device including:
at least one processor; and
at least one memory communicatively coupled with the at least one processor and storing processor-readable code that, when executed by the at least one processor, is configured to perform the method of any one or more of clauses 1-17.
19. A method for wireless communication performed by a wireless communication device, including:
transmitting first coordinated restricted target wake time (r-TWT) signaling information indicating a first r-TWT service period (SP) associated with a first basic service set (BSS); and
transmitting second coordinated r-TWT signaling information indicating a second r-TWT SP associated with a second BSS based on the first r-TWT SP.
20. The method of clause 19, where the first r-TWT SP is orthogonal to the second r-TWT SP in time.
21. The method of clause 19, where the first r-TWT SP overlaps the second r-TWT SP in time.
22. The method of any of clauses 19 or 21, where the first coordinated r-TWT signaling information indicates a transmit power associated with communications in the first BSS during the first r-TWT SP and the second coordinated r-TWT signaling information indicates a transmit power associated with communications in the second BSS during the second r-TWT SP.
23. The method of any of clauses 19, 21, or 22, where the first coordinated r-TWT signaling information indicates an allocation of first frequency resources for communications in the first BSS during the first r-TWT SP and the second coordinated r-TWT signaling information indicates an allocation of second frequency resources for communications in the second BSS during the second r-TWT SP.
24. The method of any of clauses 19 or 21-23, where the first frequency resources are orthogonal to the second frequency resources.
25. The method of any of clauses 19-24, where the first coordinated r-TWT signaling information and the second coordinated r-TWT signaling information are carried in a broadcast target wake time (TWT) information element (IE) included in one or more packets transmitted by the wireless communication device.
26. The method of any of clauses 19-24, where the first coordinated r-TWT signaling information and the second coordinated r-TWT signaling information are carried in first and second coordinated r-TWT IEs, respectively, included in one or more packets transmitted by the wireless communication device.
27. The method of any of clauses 19-26, further including:
transmitting r-TWT schedule information indicating a third r-TWT SP associated with a third BSS associated with the wireless communication device based on the first r-TWT SP and the second r-TWT SP; and communicating with one or more wireless stations (STAs) during the third r-TWT SP based on a respective latency requirement of each of the one or more STAs.

28. A wireless communication device including:
at least one processor; and
at least one memory communicatively coupled with the at least one processor and storing processor-readable code that, when executed by the at least one processor, is configured to perform the method of any one or more of clauses 19-27.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
acquiring first coordinated restricted target wake time (r-TWT) signaling information associated with one or more first r-TWT service period (SP) schedules associated with a first overlapping basic service set (OBSS);
transmitting a management frame comprising a broadcast target wake time (TWT) element, wherein the broadcast TWT element comprises r-TWT schedule information indicating one or more second r-TWT SP schedules associated with a basic service set (BSS) associated with the wireless communication device and comprises r-TWT coordination information indicating the one or more first r-TWT SP schedules associated with the first OBSS, wherein the one or more second r-TWT SP schedules are orthogonal to the one or more first r-TWT SP schedules in time based on the first coordinated r-TWT signaling information; and
communicating with one or more first wireless stations (STAs) during the one or more second r-TWT SP schedules based on a respective latency requirement of each of the one or more first STAs.

2. The method of claim 1, wherein the one or more second r-TWT SP schedules overlap one or more third r-TWT SP schedules in time.

3. The method of claim 2, wherein the communicating with the one or more first STAs comprises:
transmitting a multi-user request-to-send (MU-RTS) frame to the one or more first STAs.

4. The method of claim 2, wherein second coordinated r-TWT signaling information includes shared SP information indicating a multiple access point (multi-AP) coordination opportunity associated with the one or more third r-TWT SP schedules.

5. The method of claim 4, further comprising:
coordinating with an access point (AP) associated with the one or more third r-TWT SP schedules, and associated with a second OBSS, based on the shared SP information so that the communications with the one or more first STAs occur concurrently with communications in second OBSS.

6. The method of claim 5, wherein the coordinating with the AP comprises:
exchanging, with the AP, transmit power information indicating at least one of a transmit power associated with the communications with the one or more first STAs or a transmit power associated with the communications in the second OBSS.

7. The method of claim 5, wherein the coordinating with the AP comprises:
exchanging, with the AP, frequency resource information indicating at least one of an allocation of frequency resources for the communications with the one or more first STAs or an allocation of frequency resources for the communications in the second OBSS.

8. The method of claim 1, wherein the first coordinated r-TWT signaling information indicates an allocation of resources for the one or more second r-TWT SP schedules.

9. The method of claim 1, wherein the first coordinated r-TWT signaling information indicates an allocation of resources for the one or more first r-TWT SP schedules.

10. The method of claim 9, further comprising:
negotiating, with an AP associated with the first OBSS, an allocation of resources for the one or more second r-TWT SP schedules based on the first coordinated r-TWT signaling information.

11. The method of claim 9, wherein the first coordinated r-TWT signaling information is carried in one or more packets transmitted to the wireless communication device by an AP associated with the first OBSS.

12. The method of claim 9, wherein the first coordinated r-TWT signaling information is carried in one or more management frames transmitted, by an AP associated with the first OBSS, to one or more STAs associated with the first OBSS.

13. The method of claim 12, wherein the first coordinated r-TWT signaling information is received from a STA associated with the BSS that intercepts the one or more management frames transmitted by the AP associated with the first OBSS.

14. A wireless communication device for wireless communication, comprising:
one or more memories storing processor-executable code; and
one or more processors coupled with the one or more memories and individually or collectively operable to execute the code to cause the wireless communication device to:
acquire first coordinated restricted target wake time (r-TWT) signaling information associated with one or more first r-TWT service period (SP) schedules associated with a first overlapping basic service set (OBSS);
transmit a management frame comprising a broadcast target wake time (TWT) element, wherein the broadcast TWT element comprises r-TWT schedule information indicating one or more second r-TWT SP schedules associated with a basic service set (BSS) associated with the wireless communication device and comprises r-TWT coordination information indicating the one or more first r-TWT SP schedules associated with the first OBSS, wherein the one or more second r-TWT SP schedules are orthogonal to the one or more first r-TWT SP schedules in time based on the first coordinated r-TWT signaling information; and
communicate with one or more first wireless stations (STAs) during the one or more second r-TWT SP schedules based on a respective latency requirement of each of the one or more first STAs.

15. A method for wireless communication by a wireless communication device, comprising:
transmitting, within a broadcast target wake time (TWT) element of a management frame, first coordinated restricted target wake time (r-TWT) signaling information indicating one or more first r-TWT service period (SP) schedules associated with a first basic service set (BSS); and
transmitting, within the broadcast TWT element of the management frame, second coordinated r-TWT signaling information indicating one or more second r-TWT SP schedules associated with a second BSS based on the one or more first r-TWT SP schedules, wherein the one or more first r-TWT SP schedules are orthogonal to the one or more second r-TWT SP schedules in time.

16. The method of claim 15, wherein the first coordinated r-TWT signaling information indicates a transmit power associated with communications in the first BSS during the one or more first r-TWT SP schedules and the second coordinated r-TWT signaling information indicates a transmit power associated with communications in the second BSS during the one or more second r-TWT SP schedules.

17. The method of claim 15, wherein the first coordinated r-TWT signaling information indicates an allocation of first frequency resources for communications in the first BSS during the one or more first r-TWT SP schedules and the second coordinated r-TWT signaling information indicates an allocation of second frequency resources for communications in the second BSS during the one or more second r-TWT SP schedules.

18. The method of claim 17, wherein the first frequency resources are orthogonal to the second frequency resources.

19. The method of claim 15, further comprising:
transmitting r-TWT schedule information indicating one or more fifth r-TWT SP schedules associated with a third BSS associated with the wireless communication device based on the one or more first r-TWT SP schedules and the one or more second r-TWT SP schedules; and
communicating with one or more wireless STAs during the one or more fifth r-TWT SP schedules based on a respective latency requirement of each of the one or more STAs.

20. A wireless communication device for wireless communication, comprising:
one or more memories storing processor-executable code; and
one or more processors coupled with the one or more memories and individually or collectively operable to execute the code to cause the wireless communication device to:
transmit, within a broadcast target wake time (TWT) element of a management frame, first coordinated restricted target wake time (r-TWT) signaling information indicating one or more first r-TWT service period (SP) schedules associated with a first basic service set (BSS); and
transmit, within the broadcast TWT element of the management frame, second coordinated r-TWT signaling information indicating one or more second r-TWT SP schedules associated with a second BSS based on the one or more first r-TWT SP schedules, wherein the one or more first r-TWT SP schedules are orthogonal to the one or more second r-TWT SP schedules in time.

21. The wireless communication device of claim 20, wherein the one or more processors are individually or collectively operable to execute the code to cause the wireless communication device to:
transmit r-TWT schedule information indicating one or more fifth r-TWT SP schedules associated with a third BSS associated with the wireless communication device based on the one or more first r-TWT SP schedules and the one or more second r-TWT SP schedules; and
communicate with one or more wireless STAs during the one or more fifth r-TWT SP schedules based on a respective latency requirement of each of the one or more STAs.

* * * * *